US012593206B2

(12) United States Patent
Zhang et al.

(10) Patent No.: US 12,593,206 B2
(45) Date of Patent: Mar. 31, 2026

(54) METHOD FOR AUTHENTICATION FOR NSWO SERVICE, DEVICE, AND STORAGE MEDIUM

(71) Applicant: HUAWEI TECHNOLOGIES CO., LTD., Shenzhen (CN)

(72) Inventors: Bo Zhang, Shenzhen (CN); Fei Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 133 days.

(21) Appl. No.: 18/502,799

(22) Filed: Nov. 6, 2023

(65) Prior Publication Data

US 2024/0073685 A1     Feb. 29, 2024

Related U.S. Application Data

(63) Continuation of application No. PCT/CN2022/091523, filed on May 7, 2022.

(30) Foreign Application Priority Data

May 8, 2021     (CN) .......................... 202110502550.3

(51) Int. Cl.
*H04W 12/06* (2021.01)
*H04L 9/32* (2006.01)
(Continued)

(52) U.S. Cl.
CPC ........... *H04W 12/06* (2013.01); *H04L 9/3271* (2013.01); *H04L 63/0892* (2013.01); *H04L 2209/80* (2013.01); *H04W 12/72* (2021.01)

(58) Field of Classification Search
CPC .... H04W 12/06; H04W 12/72; H04L 9/3271; H04L 63/0892; H04L 2209/80
See application file for complete search history.

(56) References Cited

U.S. PATENT DOCUMENTS

| | | | |
|---|---|---|---|
| 6,950,521 B1 * | 9/2005 | Marcovici ........... | H04W 12/122 713/169 |
| 2011/0010764 A1 * | 1/2011 | Lei ........................ | H04L 9/3273 726/7 |

(Continued)

OTHER PUBLICATIONS

3GPP TS 33.501 V17.1.0 (Mar. 2021), 3rd Generation Partnership Project; Technical Specification Group Services and. System Aspects; Security architecture and procedures for 5G system (Release 17), Apr. 6, 2021, XP052000595A, 256. Total pages.

(Continued)

*Primary Examiner* — David J Pearson
(74) *Attorney, Agent, or Firm* — Rimon PC

(57) ABSTRACT

Embodiments of this application are applicable to the field of communication technologies, and provide a method for authentication for an NSWO service, a device, and a storage medium, applicable to a 5G network. The method for authentication for an NSWO service includes: After determining to perform the NSWO service, the UE sends a SUCI to an AN device. The AN device sends a second request message to an NSWO network element. After determining to perform authentication for the NSWO service, the NSWO network element sends a first authentication request message to an AUSF. After determining to perform authentication for the NSWO service, the AUSF sends a second authentication request message to a UDM. The UDM determines to use an EAP-AKA' authentication method. Then, the UDM, the AUSF, the NSWO network element, the AN device, and the UE sequentially complete an authentication procedure based on EAP-AKA' authentication.

20 Claims, 11 Drawing Sheets

(51) Int. Cl.
   *H04L 9/40*          (2022.01)
   *H04W 12/72*        (2021.01)

(56)                    References Cited

U.S. PATENT DOCUMENTS

| | | | |
|---|---|---|---|
| 2019/0215691 A1* | 7/2019 | Salkintzis | H04W 12/069 |
| 2021/0068048 A1* | 3/2021 | Chauhan | H04W 88/06 |
| 2024/0056446 A1* | 2/2024 | Castellanos Zamora | |
| | | | H04L 69/08 |
| 2024/0298174 A1* | 9/2024 | Rajadurai | H04W 12/06 |

OTHER PUBLICATIONS

AT and T et al: "New SID on Non Seamless WLAN Offload in 5GC using 3GPP credentials", 3GPP TSG-SA Meeting #91-e, e-meeting, Mar. 18-29, 2021, SP-210262, total 3 pages.

3rd Generation Partnership Project; Technical Specification Group Services and System Aspects; Architecture enhancements for non-3GPP accesses (Release 17), 3GPP TS 23.402 V17.0.0 (Mar. 2021), Technical Specification, total 314 pages.

3rd Generation Partnership Project; Technical Specification Group Services and System Aspects; Procedures for the 5G System (5GS); Stage 2 (Release 17), 3GPP TS 23.502 V17.0.0 (Mar. 2021), Technical Specification, total 646 pages.

Atandt et al., "New SID on Non Seamless WLAN Offload in 5GC using 3GPP credentials", 3GPP TSG-SA Meeting #91-e e-meeting, SP-210121, Mar. 18-29, 2021, total 4 pages.

Huawei et al., "Editorial corrections", SA WG2 Meeting #128, S2-187083, Jul. 2-6, 2018, total 15 pages.

* cited by examiner

1

METHOD FOR AUTHENTICATION FOR NSWO SERVICE, DEVICE, AND STORAGE MEDIUM

CROSS-REFERENCE TO RELATED APPLICATIONS

This application is a continuation of International Application No. PCT/CN2022/091523, filed on May 7, 2022, which claims priority to Chinese Patent Application No. 202110502550.3, filed on May 8, 2021. The disclosures of the aforementioned applications are hereby incorporated by reference in their entireties.

TECHNICAL FIELD

Embodiments of this application relate to the field of communication technologies, and in particular, to a method for authentication for an NSWO service, a device, and a storage medium.

BACKGROUND

In a 4th generation (4G) communication system network, the 3rd generation partnership project (3GPP) introduces a non-seamless wireless local area network offload (NSWO) service. When a terminal device performs the NSWO service, service data may be offloaded, by using an access network (AN) device, to directly access the internet.

Before the terminal device performs the NSWO service, the AN device, a 3GPP authentication, authorization and accounting (AAA) server, and a home subscriber server (HSS) need to complete authentication on the terminal device. It may be understood that the AN device completes authentication on the terminal device by using an operator. The AN device provides the NSWO service for the terminal device only after the operator successfully performs authentication on the terminal device.

With development of communication technologies, a 5th generation (5G) communication system network also supports the NSWO service. The 5G network and the 4G network might include different devices. For example, the 5G network might not include a 3GPP AAA server. In addition, the 5G network and the 4G network support different authentication algorithms. Therefore, implementation of authentication on the terminal device for the NSWO service in the 5G network needs to be urgently resolved.

SUMMARY

Embodiments of this application provide a method for authentication for an NSWO service, a device, and a storage medium, to implement authentication on a terminal device for the NSWO service in a 5G network or the like.

According to a first aspect, a method for authentication for an NSWO service is provided, including: after a terminal device determines to perform the NSWO service, sending a subscription concealed identifier (SUCI) to an access network device; receiving a third authentication request message that is sent by an NSWO network element via the access network device, where the third authentication request message is an authentication request message corresponding to an extensible authentication protocol authentication and key agreement (EAP-AKA') authentication algorithm; performing authentication verification on a network by using the EAP-AKA' authentication algorithm; and after the authentication verification succeeds, sending a fourth authentication request message to the NSWO network element via the access network device.

The method for authentication for an NSWO service that is provided in the first aspect may be applied to a terminal device or UE. Related network elements in a complete authentication procedure for the NSWO service include UE, an AN device, an NSWO network element, an authentication server function (AUSF), and a unified data management server (UDM). After determining to perform the NSWO service, the UE starts an authentication procedure for the NSWO service. In the authentication process, it is determined to use an EAP-AKA' authentication method, thereby avoiding an authentication failure caused by selecting a 5G AKA authentication method, and implementing authentication for the NSWO service in a 5G network or the like.

In a possible implementation, a type of a subscription permanent identifier (SUPI) included in the SUCI indicates a need for performance of performance of authentication for the NSWO service; and/or the SUCI includes service indication information, and the service indication information indicates a need for performance of performance of authentication for the NSWO service.

In this implementation, the AN device, the NSWO network element, the AUSF, or the UDM may directly determine, based on the SUCI, to perform authentication for the NSWO service.

In a possible implementation, before the receiving a third authentication request message that is sent by an NSWO network element via the access network device, the method further includes: sending first NSWO indication information to the access network device. The first NSWO indication information indicates a need for performance of authentication for the NSWO service.

In this implementation, the AN device, the NSWO network element, the AUSF, or the UDM may directly determine, based on the first NSWO indication information, to perform authentication for the NSWO service.

In a possible implementation, the first NSWO indication information and the SUCI are in one message.

In this implementation, the first NSWO indication information and the SUCI are carried in one message, thereby reducing a quantity of air interface messages.

In a possible implementation, after the authentication verification succeeds, the method further includes one of the following: calculating a key CK' and a key IK', and then deleting the key CK' and the key IK'; calculating the key CK' and the key IK', and forgoing calculating a key $K_{AUSF}$, wherein the key $K_{AUSF}$ is calculated based on the key CK' and the key IK', and then deleting the key CK' and the key IK'; calculating the key CK' and the key IK', and calculating the key $K_{AUSF}$ based on the key CK' and the key IK', and then deleting the key CK' and the key IK', and deleting the key $K_{AUSF}$, or forgoing replacing a key $K_{AUSF}$ stored locally in the terminal device; or after the authentication verification succeeds, forgoing calculating the key CK' and the key IK'.

In this implementation, after performing authentication verification on the network successfully, the UE may not calculate the key CK' or the key IK', or delete the calculated key CK' and key IK' or key $K_{AUSF}$, or after the key $K_{AUSF}$ is calculated, the newly generated key $K_{AUSF}$ is not used to replace the locally existing key $K_{AUSF}$, thereby avoiding impact on an existing key architecture of the UE.

In a possible implementation, before the terminal device determines to perform the NSWO service, the method further includes: receiving second NSWO indication information sent by the access network device, where the second NSWO indication information indicates that the access network device supports the NSWO service; and determining, based on the second NSWO indication information, to perform authentication based on a 5G key, or perform authentication based on a SIM, or perform authentication based on a key used for initial user authentication.

In this implementation, the AN device sends the second NSWO indication information to the UE, to notify the UE that the AN device supports the NSWO service, so that authentication for the NSWO service can be implemented.

In a possible implementation, the sending a SUCI to an access network device may include: sending a connection establishment request message to the access network device. The connection establishment request message includes the SUCI and the first NSWO indication information.

In this implementation, after determining to perform the NSWO service, the UE accesses the AN to establish a connection. The connection establishment request message carries both the SUCI and the first NSWO indication information, to start an authentication procedure for the NSWO service, thereby reducing a quantity of air interface messages.

In a possible implementation, the sending a SUCI to an access network device may include: receiving a first request message sent by the access network device; and sending a first response message to the access network device. The first response message includes the first NSWO indication information and the SUCI.

In this implementation, the AN device sends the first request message to the UE, to trigger the UE to perform EAP authentication. After determining to perform the NSWO service, the UE receives the first request message, determines to perform EAP authentication, and determines to perform authentication for the NSWO service.

According to a second aspect, a method for authentication for an NSWO service is provided, including: receiving a SUCI sent by a terminal device; determining an address of an NSWO network element based on the SUCI; sending a second request message to the NSWO network element based on the address of the NSWO network element, where the second request message includes the SUCI; receiving a third authentication request message sent by the NSWO network element, where the third authentication request message is an authentication request message corresponding to an EAP-AKA' authentication algorithm; sending the first authentication request message to the terminal device; receiving a fourth authentication request message sent by the terminal device; and sending the fourth authentication request message to the NSWO network element.

The method for authentication for an NSWO service that is provided in the second aspect may be applied to an AN device. Related network elements in a complete authentication procedure for the NSWO service include UE, an AN device, an NSWO network element, an AUSF, and a UDM. In the authentication procedure for the NSWO service, it is determined to use an EAP-AKA' authentication method, thereby avoiding an authentication failure caused by selecting a 5G AKA authentication method, and implementing authentication for the NSWO service in a 5G network or the like.

In a possible implementation, a type of a SUPI included in the SUCI indicates a need for performance of authentication for the NSWO service; and/or the SUCI includes service indication information, and the service indication information indicates a need for performance of authentication for the NSWO service.

In a possible implementation, before the determining an address of an NSWO network element based on the SUCI, the method further includes: receiving first NSWO indication information sent by the terminal device. The first NSWO indication information indicates a need for performance of authentication for the NSWO service.

In a possible implementation, the first NSWO indication information and the SUCI are in one message.

In a possible implementation, the second request message further includes the first NSWO indication information.

In this implementation, the NSWO network element, the AUSF, or the UDM may directly determine, based on the first NSWO indication information, to perform authentication for the NSWO service.

In a possible implementation, the second request message further includes third NSWO indication information, and the third NSWO indication information indicates a need for performance of authentication for the NSWO service.

In this implementation, the NSWO network element, the AUSF, or the UDM may directly determine, based on the third NSWO indication information, to perform authentication for the NSWO service.

In a possible implementation, before the receiving a SUCI sent by a terminal device, the method further includes: sending second NSWO indication information to the terminal device. The second NSWO indication information indicates that the access network device supports the NSWO service.

In a possible implementation, the second request message further includes an access network identity of the access network device.

In this implementation, the access network identity may be used by the NSWO network element to send first identification information of the AN device to the AUSF, so that the UDM finally uses the first identification information when calculating an EAP-AKA' authentication vector.

In a possible implementation, the determining an address of an NSWO network element based on the SUCI includes: obtaining a target network identifier and/or a target routing identifier from the SUCI; and obtaining an address, corresponding to the target network identifier and/or the target routing identifier, of an NSWO network element based on a mapping relationship between a network identifier and/or a routing identifier and an NSWO network element address.

In a possible implementation, the determining an address of an NSWO network element based on the SUCI includes: obtaining a target network identifier and/or a target routing identifier from the SUCI; sending the target network identifier and/or the target routing identifier to a first address management network element; and receiving an address of an NSWO network element sent by the first address management network element.

In a possible implementation, the receiving a SUCI sent by a terminal device includes: receiving a connection establishment request message sent by the terminal device. The connection establishment request message includes the SUCI and the first NSWO indication information.

In a possible implementation, the receiving a SUCI sent by a terminal device includes: sending a first request message to the terminal device, and receiving a first response message sent by the terminal device. The first response message includes the first NSWO indication information and the SUCI.

According to a third aspect, a method for authentication for an NSWO service is provided, including: receiving a second request message sent by an access network device, where the second request message includes a SUCI of a terminal device; determining, based on the second request message, to perform authentication for the NSWO service;

5 sending a first authentication request message to an AUSF, where the first authentication request message includes the SUCI; receiving a first authentication response message sent by the AUSF, where the first authentication response message is an authentication response message corresponding to an EAP-AKA' authentication algorithm; sending a third authentication request message to the access network device based on the first authentication response message, where the third authentication request message is an authentication request message corresponding to the EAP-AKA' authentication algorithm; receiving a fourth authentication request message sent by the access network device; and sending a fifth authentication request message to the AUSF based on the fourth authentication request message.

The method for authentication for an NSWO service that is provided in the third aspect may be applied to an NSWO network element. Related network elements in a complete authentication procedure for the NSWO service include UE, an AN device, an NSWO network element, an AUSF, and a UDM. In the authentication procedure for the NSWO service, it is determined to use an EAP-AKA' authentication method, thereby avoiding an authentication failure caused by selecting a 5G AKA authentication method, and implementing authentication for the NSWO service in a 5G network or the like.

In a possible implementation, the determining, based on the second request message, to perform authentication for the NSWO service includes at least one of the following cases: determining, based on NSWO indication information included in the second request message, to perform authentication for the NSWO service; determining, based on the SUCI, to perform authentication for the NSWO service; or determining an address or an access network identity of the access network device based on the second request message, and after determining, based on the address or the access network identity of the access network device, that the access network device supports the NSWO service, determining to perform authentication for the NSWO service.

In a possible implementation, a type of a SUPI included in the SUCI indicates a need for performance of authentication for the NSWO service; and/or the SUCI includes service indication information, and the service indication information indicates a need for performance of authentication for the NSWO service.

In a possible implementation, the first authentication request message further includes fourth NSWO indication information, and the fourth NSWO indication information indicates a need for performance of authentication for the NSWO service.

In this implementation, the AUSF or the UDM may directly determine, based on the fourth NSWO indication information, to perform authentication for the NSWO service.

In a possible implementation, the first authentication request message further includes one of the following: an access network identity of the access network device carried in the second request message; a serving network name corresponding to the access network identity of the access network device; an access network identity determined based on related information of the access network device; a preset access network identity indicating to perform authentication for the NSWO service; or a preset serving network name indicating to perform authentication for the NSWO service.

In a possible implementation, the second authentication request message further includes second identification information of the access network device, and the access network device is an access network device connected to the terminal device. The second identification information includes: first information or first identification information carried in the first authentication request message. If the first identification information carried in the first authentication request message is the access network identity of the access network device, the first information is the serving network name corresponding to the access network identity. If the first authentication request message does not carry the first identification information, the first information is the preset access network identity or the preset serving network name. Both the preset access network identity and the preset serving network name indicate to perform authentication for the NSWO service.

In a possible implementation, the first authentication request message is an authentication service request message for UE authentication, and the first authentication response message is an authentication service response message for UE authentication.

In a possible implementation, both the first authentication request message and the first authentication response message are messages corresponding to a newly added AUSF service, and the newly added AUSF service indicates a need for performance of authentication for the NSWO service.

In this implementation, the AUSF may directly determine, based on the newly added AUSF service, to perform authentication for the NSWO service.

According to a fourth aspect, a method for authentication for an NSWO service is provided, including: receiving a first authentication request message sent by an NSWO network element, where the first authentication request message includes a SUCI; determining, based on the first authentication request message, to perform authentication for the NSWO service; sending a second authentication request message to a UDM, where the second authentication request message includes the SUCI; receiving a second authentication response message sent by the UDM, where the second authentication response message includes a second EAP-AKA' authentication vector; sending a first authentication response message to the NSWO network element based on the second authentication response message, where the first authentication response message is an authentication response message corresponding to an EAP-AKA' authentication algorithm; receiving a fifth authentication request message sent by the NSWO network element; and performing authentication on a terminal device based on the fifth authentication request message.

The method for authentication for an NSWO service that is provided in the fourth aspect may be applied to an AUSF. Related network elements in a complete authentication procedure for the NSWO service include UE, an AN device, an NSWO network element, an AUSF, and a UDM. In the authentication procedure for the NSWO service, it is determined to use an EAP-AKA' authentication method, thereby avoiding an authentication failure caused by selecting a 5G AKA authentication method, and implementing authentication for the NSWO service in a 5G network or the like.

In a possible implementation, the determining, based on the first authentication request message, to perform authentication for the NSWO service includes at least one of the following cases: determining, based on NSWO indication information included in the first authentication request message, to perform authentication for the NSWO service, where the NSWO indication information indicates a need for performance of authentication for the NSWO service; when determining that the first authentication request message is a request message corresponding to a newly added authentication server function AUSF service, determining to perform authentication for the NSWO service, where the newly added AUSF service indicates a need for performance of authentication for the NSWO service; determining, based on the SUCI, to perform authentication for the NSWO service; or determining a type or an address of the NSWO network element based on the first authentication request message, and after determining, based on the type or the address of the NSWO network element, that the NSWO network element supports the NSWO service, determining to perform authentication for the NSWO service.

In a possible implementation, a type of a SUPI included in the SUCI indicates a need for performance of authentication for the NSWO service; and/or the SUCI includes service indication information, and the service indication information indicates a need for performance of authentication for the NSWO service.

In a possible implementation, the second authentication request message further includes fifth NSWO indication information, and the fifth NSWO indication information indicates a need for performance of authentication for the NSWO service.

In this implementation, the second authentication request message carries the fifth NSWO indication information, so that the UDM may directly determine to perform authentication for the NSWO service.

In a possible implementation, after the determining, based on the first authentication request message, to perform authentication for the NSWO service, the method further includes: determining to use the EAP-AKA' authentication algorithm. Correspondingly, the second authentication request message further includes algorithm indication information, and the algorithm indication information indicates a need for performance of EAP-AKA' authentication.

In this implementation, the second authentication request message carries the algorithm indication information, so that the UDM may directly determine to use the EAP-AKA' authentication algorithm, thereby simplifying processing of the UDM.

In a possible implementation, the first authentication request message further includes first identification information of an access network device, and the access network device is an access network device connected to the terminal device. The first identification information includes one of the following: an access network identity of the access network device; a serving network name corresponding to the access network identity of the access network device; a preset access network identity indicating to perform authentication for the NSWO service; or a preset serving network name indicating to perform authentication for the NSWO service.

In this implementation, the first identification information may be used by the AUSF to send second identification information of the AN device to the UDM, so that the UDM finally uses the second identification information when calculating an EAP-AKA' authentication vector.

In a possible implementation, the second authentication request message further includes second identification information of the access network device, and the access network device is an access network device connected to the terminal device. The second identification information includes: first information or first identification information carried in the first authentication request message. If the first identification information carried in the first authentication request message is the access network identity of the access network device, the first information is the serving network name corresponding to the access network identity. If the first authentication request message does not carry the first identification information, the first information is a preset access network identity or a preset serving network name. Both the preset access network identity and the preset serving network name indicate to perform authentication for the NSWO service.

In this implementation, the second identification information may be used when the UDM subsequently calculates an EAP-AKA' authentication vector.

In a possible implementation, the first authentication request message is an authentication service request message for UE authentication, and the first authentication response message is an authentication service response message for UE authentication.

In a possible implementation, both the first authentication request message and the first authentication response message are messages corresponding to a newly added AUSF service, and the newly added AUSF service indicates a need for performance of authentication for the NSWO service.

In a possible implementation, the second authentication request message is a get service request message for UE authentication, and the second authentication response message is a get service response message for UE authentication.

In a possible implementation, both the second authentication request message and the second authentication response message are messages corresponding to a newly added UDM service, and the newly added UDM service indicates a need for performance of authentication for the NSWO service.

In this implementation, the UDM may directly determine, based on the newly added UDM service, to perform authentication for the NSWO service.

In a possible implementation, the second authentication response message further includes the SUPI of the terminal device. The method further includes: after the authentication performed on the terminal device based on the fifth authentication request message succeeds, sending a first NSWO authentication result to the UDM. The first NSWO authentication result includes the SUPI, and/or the access network identity of the access network device, and/or the serving network name corresponding to the access network identity, and the access network device is an access network device connected to the terminal device.

In this implementation, after determining that the authentication performed on the UE for the NSWO service succeeds, the AUSF may notify the UDM of the successfully authenticated UE and/or the AN device accessed by the successfully authenticated UE, so that the UDM may record the successfully authenticated UE and/or the AN device accessed by the successfully authenticated UE, to subsequently complete charging for the UE or the AN device.

In a possible implementation, the first NSWO authentication result further includes authentication indication information, and the authentication indication information indicates that the authentication performed on the terminal device for the NSWO service succeeds.

In a possible implementation, the first NSWO authentication result is included in a UE authentication result confirmation message.

In a possible implementation, the second EAP-AKA' authentication vector does not include a key CK' or a key IK', and the first authentication response message includes the second EAP-AKA' authentication vector.

In a possible implementation, the second EAP-AKA' authentication vector includes a key CK' and a key IK', and the first authentication response message includes the second EAP-AKA' authentication vector.

In a possible implementation, the second EAP-AKA' authentication vector includes a key CK' and a key IK', and the sending a first authentication response message to the NSWO network element based on the second authentication response message includes: deleting the key CK' and the key IK' from the second EAP-AKA' authentication vector; and sending the first authentication response message to the NSWO network element. The first authentication response message includes the second EAP-AKA' authentication vector with the keys deleted.

In this implementation, the AUSF deletes the key CK' and the key IK' from the second EAP-AKA' authentication vector, thereby preventing the key CK' and the key IK' that are newly generated in the authentication process for the NSWO service from affecting a related key already generated in an existing authentication procedure.

In a possible implementation, after the performing authentication on a terminal device based on the fifth authentication request message, and after a key CK' and a key IK' are received, the method further includes: forgoing calculating a key $K_{AUSF}$, wherein the key $K_{AUSF}$ is calculated based on the key CK' and the key IK'; or calculating the key $K_{AUSF}$ based on the key CK' and the key IK', and forgoing replacing a key $K_{AUSF}$ stored locally in the AUSF.

In this implementation, the AUSF does not calculate the new key $K_{AUSF}$ or does not perform replacement after calculating the new key $K_{AUSF}$, so that the newly generated key $K_{AUSF}$ does not affect a related key generated by the AUSF in an existing authentication procedure.

In a possible implementation, the method further includes: deleting the key CK' and the key IK'; and/or deleting the key $K_{AUSF}$.

In this implementation, the AUSF deletes the keys newly generated in the authentication process for the NSWO service, thereby preventing the newly generated keys from affecting a related key generated by the AUSF in an existing authentication procedure.

In a possible implementation, the method further includes: if the authentication on the terminal device based on the fifth authentication request message succeeds, sending a second NSWO authentication result to a charging NF. The second NSWO authentication result includes the SUPI of the terminal device, and/or the access network identity of the access network device, and/or the serving network name corresponding to the access network identity, the SUPI is included in the second authentication response message, and the access network device is an access network device connected to the terminal device.

In this implementation, after determining that the authentication performed on the UE for the NSWO service succeeds, the AUSF may notify the charging NF of the successfully authenticated UE and/or the AN device accessed by the successfully authenticated UE, so that the charging NF subsequently completes charging for the UE or the AN device.

According to a fifth aspect, a method for authentication for an NSWO service is provided, including: receiving a second authentication request message sent by an AUSF, where the second authentication request message includes a SUCI; calculating a SUPI based on the SUCI; determining, based on the second authentication request message, to use an EAP-AKA' authentication method; obtaining a first EAP-AKA' authentication vector based on the SUPI; and sending a second authentication response message to the AUSF. The second authentication response message includes a second EAP-AKA' authentication vector.

The method for authentication for an NSWO service that is provided in the fifth aspect may be applied to a UDM. Related network elements in a complete authentication procedure for the NSWO service include UE, an AN device, an NSWO network element, an AUSF, and a UDM. In the authentication procedure for the NSWO service, the UDM determines to use the EAP-AKA' authentication method, thereby avoiding an authentication failure caused by selecting a 5G AKA authentication method, and implementing authentication for the NSWO service in a 5G network or the like.

In a possible implementation, the determining, based on the second authentication request message, to use an EAP-AKA' authentication method includes at least one of the following cases: when determining that the second authentication request message is a request message corresponding to a newly added UDM service, determining to perform authentication for the NSWO service, where the newly added UDM service indicates a need for performance of authentication for the NSWO service; or determining, based on second information in the second authentication request message, to use the EAP-AKA' authentication method. The second information includes at least one of the following: the second information is NSWO indication information, and the NSWO indication information indicates a need for performance of authentication for the NSWO service; the second information is the SUCI, and the SUCI indicates a need for performance of authentication for the NSWO service; or the second information is algorithm indication information, and the algorithm indication information indicates a need for performance of EAP-AKA' authentication.

In a possible implementation, a type of the SUPI included in the SUCI indicates a need for performance of authentication for the NSWO service; and/or the SUCI includes service indication information, and the service indication information indicates a need for performance of authentication for the NSWO service.

In a possible implementation, the second EAP-AKA' authentication vector does not include a key CK' or a key IK'.

In this implementation, the key CK' and the key IK' are removed and not sent to the AUSF, thereby preventing the key CK' and the key IK' that are newly generated in the authentication process for the NSWO service from affecting a related key already generated by the UE or the AUSF in an existing authentication procedure.

In a possible implementation, the second authentication request message further includes second identification information of an access network device, and the access network device is an access network device connected to a terminal device. The second identification information includes: first information or first identification information carried in a first authentication request message. The first authentication request message is a message sent by an NSWO network element to the AUSF. If the first identification information carried in the first authentication request message is an access network identity of the access network device, the first information is a serving network name corresponding to the access network identity. If the first authentication request message does not carry the first identification information, the first information is a preset access network identity or a preset serving network name. Both the preset access network identity and the preset serving network name indicate to perform authentication for the NSWO service.

In a possible implementation, the second authentication request message is a get service request message for UE authentication, and the second authentication response message is a get service response message for UE authentication.

In a possible implementation, both the second authentication request message and the second authentication response message are messages corresponding to a newly added UDM service, and the newly added UDM service indicates a need for performance of authentication for the NSWO service.

In this implementation, the UDM may directly determine, based on the newly added UDM service, to perform authentication for the NSWO service.

In a possible implementation, the method further includes: receiving a first NSWO authentication result sent by the AUSF. The first NSWO authentication result includes the SUPI, and/or the access network identity of the access network device, and/or the serving network name corresponding to the access network identity, the access network device is an access network device connected to the terminal device, and the first NSWO authentication result indicates that authentication performed on the terminal device for the NSWO service succeeds.

In a possible implementation, the first NSWO authentication result further includes authentication indication information, and the authentication indication information indicates that the authentication performed on the terminal device for the NSWO service succeeds.

In a possible implementation, the first NSWO authentication result is included in a UE authentication result confirmation message.

According to a sixth aspect, an apparatus is provided, including units or means configured to perform steps in any one of the foregoing aspects.

According to a seventh aspect, a communication apparatus is provided. The communication apparatus includes a processor, a memory, and a transceiver. The transceiver is configured to communicate with another device, and the processor is configured to read instructions in the memory, and enable, according to the instructions, the communication apparatus to perform the method provided in any one of the foregoing aspects.

According to an eighth aspect, a program is provided. When executed by a processor, the program is configured to perform the method provided in any one of the foregoing aspects.

According to a ninth aspect, a computer-readable storage medium is provided. The computer-readable storage medium stores instructions, and when the instructions are run on a computer or a processor, the method provided in any one of the foregoing aspects is implemented.

According to a tenth aspect, a program product is provided. The program product includes a computer program, the computer program is stored in a readable storage medium, at least one processor of a device may read the computer program from the readable storage medium, and the at least one processor executes the computer program to enable the device to implement the method provided in any one of the foregoing aspects.

DESCRIPTION OF EMBODIMENTS

The following describes embodiments of this application with reference to the accompanying drawings.

Embodiments of this application may be combined with each other, and same or similar concepts or processes might not be repeatedly described in some embodiments. Terms "first", "second", "third", "fourth", and the like (if any) in embodiments of this application are used to distinguish between similar objects, but not necessarily describe a specific order or sequence.

A method for authentication for an NSWO service that is provided in embodiments of this application is applicable to an authentication procedure performed when a terminal device performs the NSWO service in a 5G network. First, the NSWO service, a 4G network architecture, and a 5G network architecture are described.

To implement an interoperability function between a 3GPP network and a wireless local area network (WLAN), the 3GPP organization defines a series of standard documents and network architectures. A 3GPP AAA-related device is introduced without changing existing architectures of a 3GPP network and a WLAN network, to implement access control and authentication based on the 3GPP network, so that user equipment (UE) may access a packet switched domain (PS) service through the WLAN network.

Figure 1:
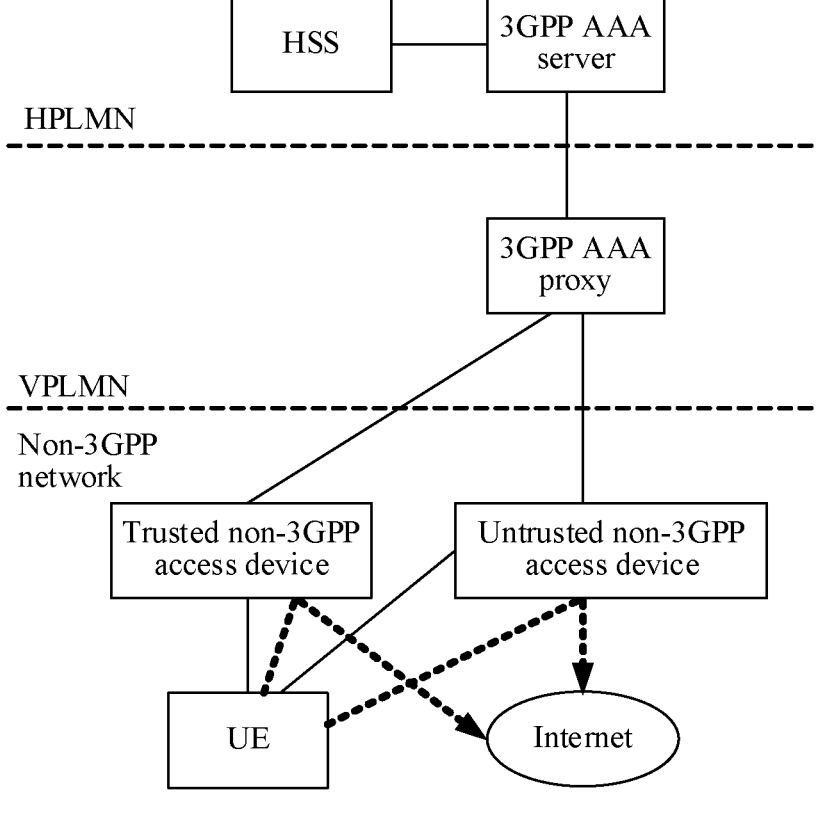
FIG. 1 is a diagram of an architecture of a 4G network according to an embodiment of this application.

For example, FIG. 1 is a diagram of an architecture of a 4G network according to an embodiment of this application. As shown in FIG. 1, the 4G network includes a non-3GPP network, a visited public land mobile network (VPLMN), and a home public land mobile network (HPLMN). The non-3GPP network includes UE, a trusted non-3GPP access network device, and an untrusted non-3GPP access network device. The VPLMN includes a 3GPP AAA proxy. The HPLMN includes a 3GPP AAA server and a home subscriber server (HSS). For a functional description of each device, refer to Table 1.

TABLE 1

| Network element name | Functional description |
|---|---|
| UE | It is also referred to as a terminal device or a terminal, and a name is not limited. The UE can provide a PS service for a user. Some examples of the terminal device are: a mobile phone, a tablet computer, a notebook computer, a palmtop computer, an internet of things (IoT) device, a wearable device, a mobile internet device (MID), and the like. This is not limited. |
| Trusted non-3GPP access network device or untrusted non-3GPP access network device | It is an access point that enables the UE to access a network. For simplicity of description, the trusted non-3GPP access network device and/or the untrusted non-3GPP access network device may be referred to as an access network (AN) device. |
| 3GPP AAA proxy | It is a network function proxy node of an authentication service, and is connected to the AN device and the 3GPP AAA server. |
| 3GPP AAA server | It is a functional network element for authentication. |
| HSS | It is configured to store subscription information of the UE, a root key for authentication, and the like. |

It should be noted that another device can be included in the 4G network in this embodiment of this application.

The 4G network supports the NSWO service. For example, as shown by a dotted line in FIG. 1, the NSWO service means that data used when the UE performs the PS service may be offloaded by using the AN device, to directly access the internet.

Before the AN device determines whether to perform the NSWO service for the UE, the UE and a network side need to complete authentication for the NSWO service. As shown in FIG. 1, authentication on the UE may be completed by using the trusted non-3GPP access network device, the 3GPP AAA proxy, the 3GPP AAA server, and the HSS. Alternatively, authentication on the UE may be completed by using the untrusted non-3GPP access network device, the 3GPP AAA proxy, the 3GPP AAA server, and the HSS. If the authentication on the UE succeeds, the HSS and the 3GPP AAA server send, to the AN device, an authentication result indicating that the authentication succeeds, so that the AN device performs the NSWO service for the UE. For example, the AN device allocates an internet protocol (IP) address of an external network to the UE, so that the UE can connect to the internet. The foregoing authentication process may be understood as follows: The AN device completes authentication on the UE by using an operator. The AN device provides the NSWO service for the UE only after the operator performs authentication on the UE successfully and determines that the UE is an authorized user of the operator.

Currently, in the 4G network, a key based on which the authentication process is performed is a key used during authentication on the UE for 3GPP network access, for example, a key stored in a universal subscriber identity module (USIM). Authentication algorithms include an extensible authentication protocol-authentication and key agreement (EAP-AKA) authentication algorithm and an EAP-AKA' authentication algorithm.

With recent development of communication technologies, a 5G network also supports the NSWO service. For example, FIG. 2 is a diagram of an architecture of a 5G network according to an embodiment of this application.

Figure 2:
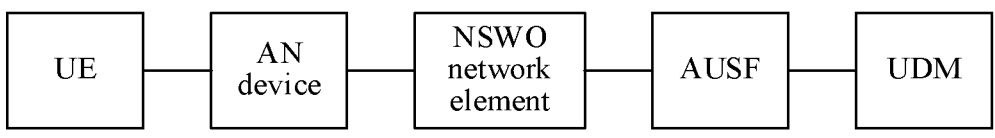
FIG. 2 is a diagram of an architecture of a 5G network according to an embodiment of this application.

As shown in FIG. 2, the 5G network includes UE, an AN device, an NSWO network element, an authentication server function (AUSF), and a unified data management (UDM). For afunctional description of each device, refer to Table 2.

TABLE 2

| Network element name | Functional description |
|---|---|
| UE | Refer to the description of the UE in Table 1. |
| AN device | It is an access point that enables the UE to access a network, for example, the trusted non-3GPP access network device or the trusted non-3GPP access network device in FIG. 1, and is not limited. |
| NSWO network element | It is a network function node of the NSWO service, and is connected to the AN device, and may also be connected to the AUSF or an AAA-related device. The NSWO network element may be deployed in an existing network function network element, or may be independently deployed, for example, deployed in an access and mobility management function (AMF), a security edge protection proxy (SEPP), a network slice-specific and SNPN authentication and authorization function (NSSAAF) network element, or a service communication proxy (SCP), the AUSF, or the like. This is not limited. Optionally, the NSWO network element may be an AAA authentication-related network element, for example, the 3GPP AAA proxy. |
| AUSF | It is a functional network element for authentication. Optionally, the AUSF may be the AAA server that supports authentication for the NSWO service in the existing 4G network, or an AUSF that supports UE authentication in the 5G network. |
| UDM | It is configured to store subscription information of the UE, a root key for authentication, and the like. |

It should be noted that another device can be included in the 5G network in this embodiment of this application.

It can be learned that the 5G network and the 4G network may include different devices. For example, as shown in FIG. 1 and FIG. 2, the 5G network might not include a 3GPP AAA server. In addition, the 5G network and the 4G network support different authentication algorithms. The 4G network supports the EAP-AKA authentication algorithm and the EAP-AKA' authentication algorithm, while the 5G network supports the EAP-AKA' authentication algorithm and a 5G AKA authentication algorithm. The 5G AKA authentication algorithm is not applicable to existing access authentication of an AN device in an NSWO service scenario. Therefore, an embodiment of this application provides an authentication procedure applicable to a case in which the UE performs the NSWO service in the 5G network.

Figure 3:
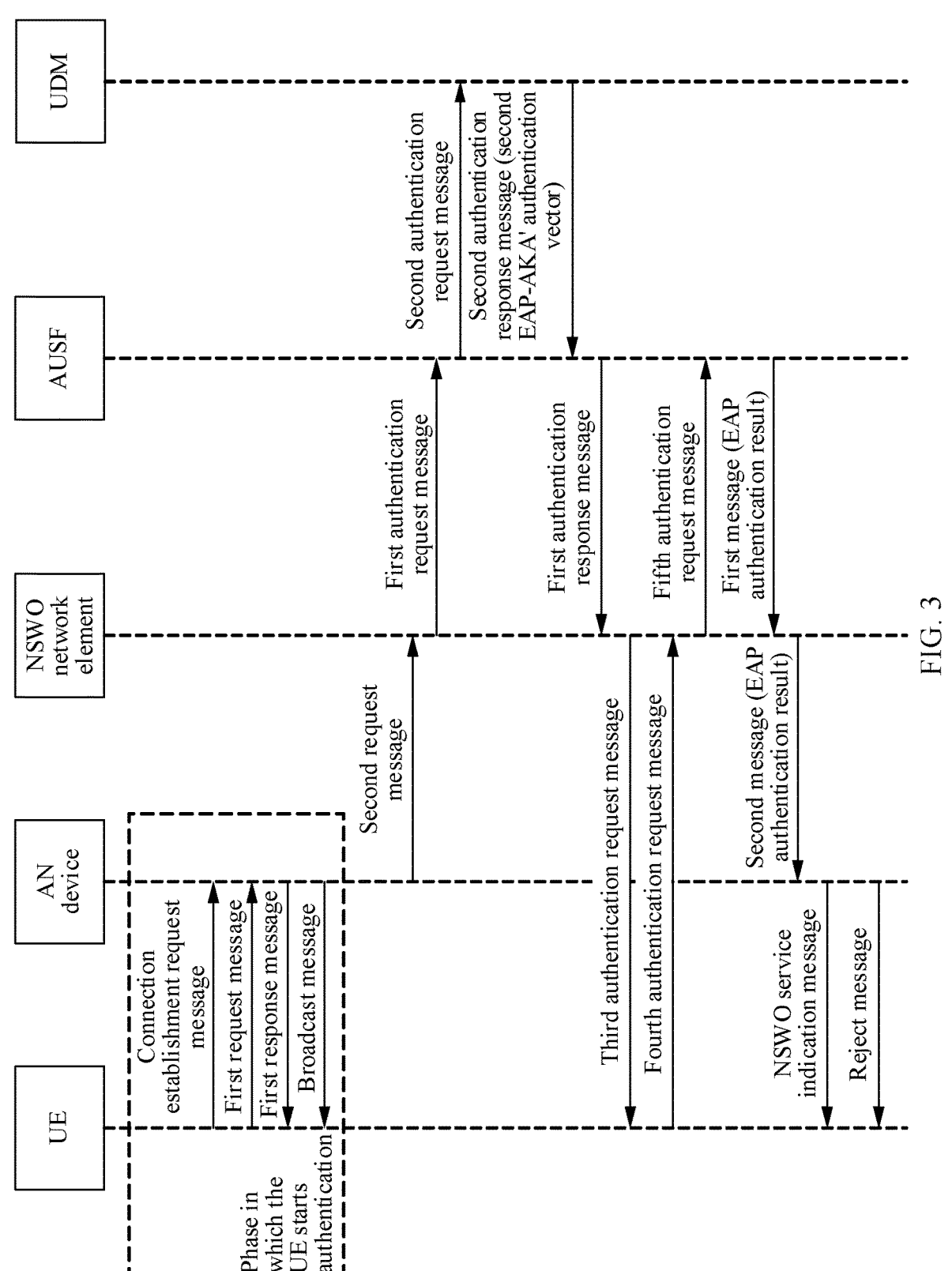
FIG. 3 is a schematic diagram of related messages in a method for authentication for an NSWO service according to an embodiment of this application.

The method for authentication for an NSWO service that is provided in this embodiment of this application relates to a relatively large quantity of network elements, and a relatively large quantity of messages are exchanged between the network elements. For ease of understanding, the messages exchanged between the network elements are briefly described. For example, FIG. 3 is a diagram of message exchange of a method for authentication for an NSWO service according to an embodiment of this application. It should be noted that FIG. 3 does not limit names of exchanged messages. As shown in FIG. 3, related messages include:

1. Message in a Phase in which the UE Starts Authentication

In the phase in which the UE starts authentication, the UE and the AN device need to determine that both support the NSWO service. Optionally, the UE may start authentication for the NSWO service. For example, when determining to perform the NSWO service, the UE may initiate authentication for the NSWO service. Optionally, the AN device may trigger the UE to start authentication for the NSWO service.

The message in the phase in which the UE starts authentication may include at least one of a connection establishment request message, a first request message, a first response message, or a broadcast message. Detailed descriptions are provided below with reference to FIG. 6 to FIG. 9.

2. Second Request Message

It is a message sent by the AN device to the NSWO network element to request authentication for the NSWO service, and includes a subscription concealed identifier (SUCI) of the UE.

Optionally, the second request message may be an AAA message.

3. First Authentication Request Message and First Authentication Response Message The first authentication request message and the first authentication response message are a pair of exchanged messages between the NSWO network element and the AUSF. The first authentication request message and the first authentication response message are respectively a request message and a response message that correspond to an AUSF service.

Optionally, the AUSF service is an existing service. For example, the existing AUSF service is an authentication service for UE authentication (Nausf_UEAuthentication_Authenticate). The first authentication request message is an authentication service request message for UE authentication (Nausf_UEAuthentication_Authenticate request), and the first authentication response message is an authentication service response message for UE authentication (Nausf_UEAuthentication_Authenticate response).

Optionally, the AUSF service may be a newly added service, and the newly added AUSF service indicates a need for performance of authentication for the NSWO service. A name of the newly added AUSF service, and names of a request message and a response message in the newly added AUSF service are not limited in this embodiment of this application. For example, the name of the newly added AUSF service may be an NSWO authentication service for UE authentication (Nausf_UEAuthentication_NSWO_Authenticate). The first authentication request message may be referred to as an NSWO authentication service request message for UE authentication (Nausf_UEAuthentication_NSWO_Authenticate request), and the first authentication response message may be referred to as an NSWO authentication service response message for UE authentication (Nausf_UEAuthentication_NSWO_Authenticate response).

4. Second Authentication Request Message and Second Authentication Response Message The second authentication request message and the second authentication response message are a pair of exchanged messages between the AUSF and the UDM. The second authentication request message and the second authentication response message are respectively a request message and a response message that correspond to a UDM service.

Optionally, the UDM service is an existing service. For example, the existing UDM service is a get service for UE authentication (Nudm_UEAuthentication_Get). The second authentication request message is a get service request message for UE authentication (Nudm_UEAuthentication_Get request), and the second authentication response message is a get service response message for UE authentication (Nudm_UEAuthentication_Get response).

Optionally, the UDM service may be a newly added service, and the newly added UDM service indicates a need for performance of authentication for the NSWO service. A name of the newly added UDM service, and names of a request message and a response message in the newly added UDM service are not limited in this embodiment of this application. For example, the name of the newly added UDM service may be an NSWO authentication service for UE authentication (Nudm_UEAuthentication_NSWO_Authenticate). The second authentication request message may be referred to as an NSWO authentication service request message for UE authentication (Nudm_UEAuthentication_NSWO_Authenticate request), and the second authentication response message may be referred to as an NSWO authentication service response message for UE authentication (Nudm_UEAuthentication_NSWO_Authenticate response).

5. Third Authentication Request Message and Fourth Authentication Request Message The third authentication request message and the fourth authentication request message are authentication-related messages transmitted between the UE and the NSWO network element by using the AN device, and are used by the UE to perform authentication verification on a network.

6. Fifth Authentication Request Message

It is a message sent by the NSWO network element to the AUSF, and is used by the AUSF to perform authentication verification on the UE.

7. First Message and Second Message

The AUSF sends the first message to the NSWO network element, which carries an EAP authentication result. The NSWO network element sends the second message to the AN device, which carries the EAP authentication result. The EAP authentication result notifies the AN device of an authentication success or an authentication failure.

It should be noted that in this embodiment of this application, content included in the first message and the second message is not limited, and an implementation of the EAP authentication result is not limited, which may be a related message in an existing EAP-AKA' authentication procedure.

8. NSWO Service Indication Message and Reject Message

If the EAP authentication result indicates an authentication success, the AN device may perform an operation of the NSWO service, for example, allocating an IP address for accessing an external network to the UE. The AN device sends the NSWO service indication message to the UE. Optionally, the NSWO service indication message may include at least one of the following: the IP address, an NSWO authorization indicator, or an authentication success indicator.

If the EAP authentication result indicates an authentication failure, the AN device sends the reject message to the UE, to indicate that the request of the UE to use the NSWO service is rejected.

It should be noted that content included in the NSWO service indication message and the reject message is not limited in this embodiment of this application, and may be related messages in an existing EAP-AKA' authentication procedure.

The following describes related concepts in embodiments of this application.

1. Subscription Permanent Identifier (SUPI)

In the 5G network, a real identity of the UE may be referred to as a SUPI, which is similar to an international mobile subscriber identity (IMSI). Generally, the SUPI does not appear on an air interface. The air interface refers to a radio interface between the UE and a network device.

2. SUCI

The SUCI is a ciphertext obtained after the UE encrypts and encapsulates the SUPI by using a key, and may be transmitted over an air interface. Correspondingly, a network device may decrypt the SUCI to obtain the SUPI, so as to determine the identity of the UE.

Optionally, the SUCI is in a network access identifier (NAI) format.

Optionally, in an implementation, the SUCI may be an existing SUCI generated based on a SUPI, for example, a SUCI used in a 5G network.

Optionally, in another implementation, the SUCI indicates a need for performance of authentication for the NSWO service. In this implementation, the AN device, the NSWO network element, the AUSF, or the UDM may determine, based on the SUCI, to perform authentication for the NSWO service.

Optionally, a type of the SUPI included in the SUCI indicates a need for performance of authentication for the NSWO service.

Currently, for the type of the SUPI, refer to Table 3. Type values 4 to 7 of the SUPI indicate reserved types. In this implementation, a new type of the SUPI may be defined for the NSWO service, and the newly defined type of the SUPI indicates a need for performance of authentication for the NSWO service. Optionally, a value of the newly defined type of the SUPI may be any value from 4 to 7.

TABLE 3

| SUPI type | Description |
| --- | --- |
| 0 | IMSI |
| 1 | Network specific identifier (NSI) |
| 2 | Global line identifier (GLI) |
| 3 | Global cable identifier (GCI) |
| 4 to 7 | Reserved |

For example, typeX is defined to indicate the NSWO service. An example of the SUCI in the NAI form is: typeX. rid678.schid1.hnkey27.ecckey<ECC ephemeral public key>.cip<encryption of user17>.mac<MAC tag value>@example.com. Optionally, a value of X may be any value from 4 to 7.

Optionally, the SUCI includes service indication information, and the service indication information indicates a need for performance of authentication for the NSWO service.

An example is used for description. For example, an example of the SUCI in the NAI form is: type0. NSWO indicator.rid678.schid1.hnkey27.ecckey<ECC ephemeral public key>.cip<encryption of user17>.mac<MAC tag value>@example.com. The NSWO indicator is service indication information.

3. NSWO Indication Information

The NSWO indication information indicates a need for performance of authentication for the NSWO service.

Optionally, the NSWO indication information may be carried in at least one of the following messages in FIG. 3: the message in the phase in which the UE starts authentication, the second request message, the first authentication request message, or the second authentication request message.

In a communication process, after receiving the message, a device A may send the message to a device B. Optionally, the device A may not process the message, and transparently transmit the message to the device B. Optionally, the device A may process the message, and send a processed message to the device B. Based on processing manners of different devices, the NSWO indication information may be further refined, including:

first NSWO indication information, which is NSWO indication information generated by the UE and sent to the AN device in the phase in which the UE starts authentication;

second NSWO indication information, which is NSWO indication information generated by the AN device and sent to the UE in the phase in which the UE starts authentication, to notify the UE that the AN device supports the NSWO service;

third NSWO indication information, which is NSWO indication information added by the AN device to the second request message;

fourth NSWO indication information, which is NSWO indication information added by the NSWO network element to the first authentication request message; and fifth NSWO indication information, which is NSWO indication information added by the AUSF to the second authentication request message.

4. First EAP-AKA' Authentication Vector and Second EAP-AKA' Authentication Vector After receiving the second authentication request message, if determining to use the EAP-AKA' authentication algorithm, the UDM calculates an EAP-AKA' authentication vector, which is referred to as a first EAP-AKA' authentication vector (RAND, AUTN, XRES, CK', IK'). The first EAP-AKA' authentication vector includes a key CK' and a key IK'.

The UDM sends the second authentication response message to the AUSF. The second authentication response message includes a second EAP-AKA' authentication vector. Optionally, the second EAP-AKA' authentication vector is the first EAP-AKA' authentication vector. Optionally, the second EAP-AKA' authentication vector is a part obtained after the key CK' and the key IK' are deleted from the first EAP-AKA' authentication vector, that is, (RAND, AUTN, XRES).

The following describes in detail technical solutions of this application by using specific embodiments. The following embodiments may be combined with each other, and same or similar concepts or processes might not be repeatedly described in some embodiments.

For ease of understanding, same steps in embodiments of this application use same step numbers.

It should be noted that an AN device has a same meaning as an AN.

It should be noted that, in embodiments of this application, an access network identity (AN ID) may be equivalent to a serving network name.

Figure 4A:
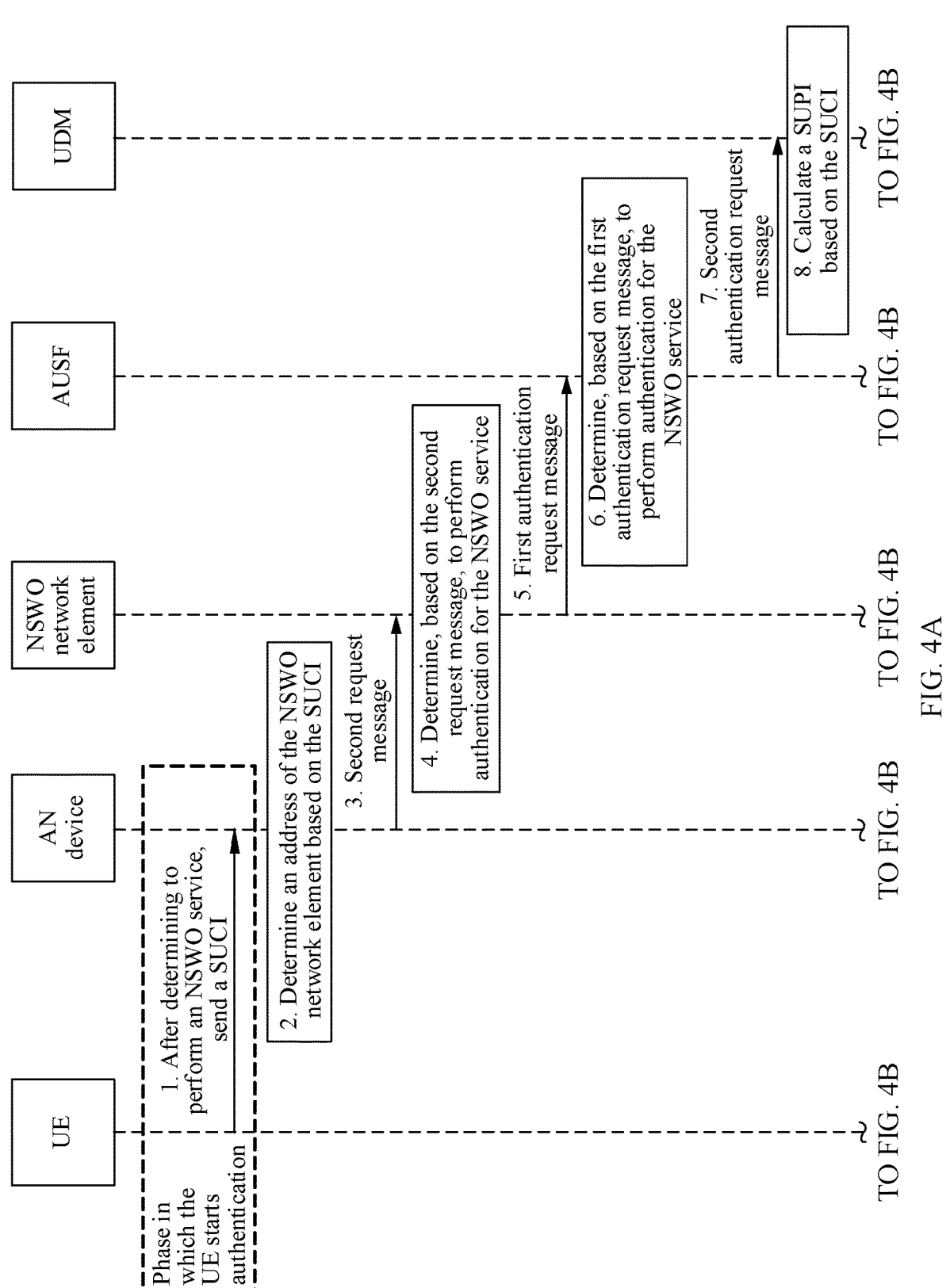
FIG. 4A and FIG. 4B are a diagram of message exchange of a method for authentication for an NSWO service according to an embodiment of this application.
Figure 4B:
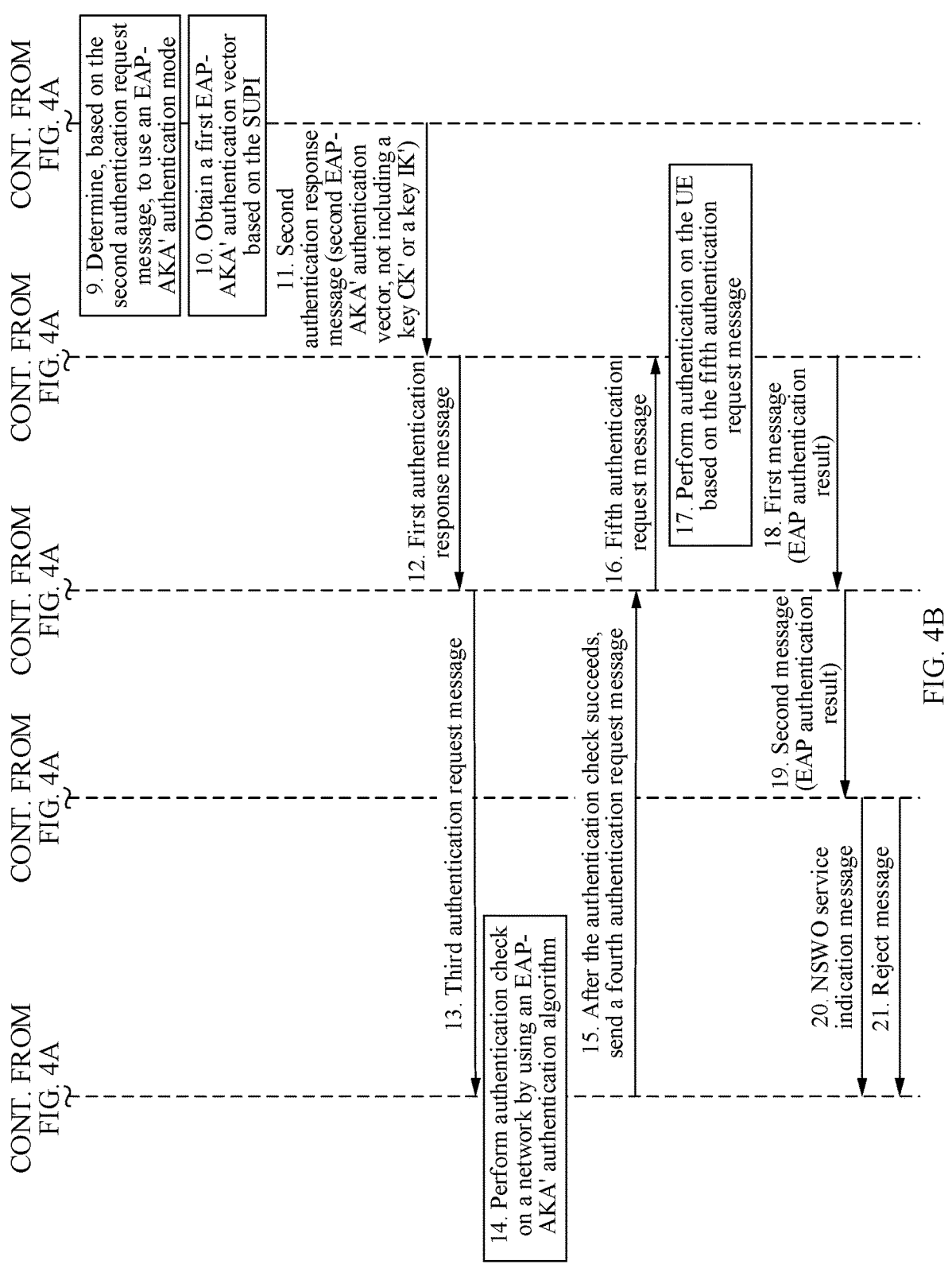

FIG. 4A and FIG. 4B are a diagram of message exchange of a method for authentication for an NSWO service according to an embodiment of this application. The method for authentication for an NSWO service that is provided in this embodiment is performed by UE, an AN device, an NSWO network element, an AUSF, and a UDM. As shown in FIG.

4A and FIG. 4B, the method for authentication for an NSWO service that is provided in this embodiment may include the following steps:

Step 1: After the UE determines to perform the NSWO service, the UE sends a SUCI to the AN device. Correspondingly, the AN device receives the SUCI sent by the UE.

This step relates to the phase in which the UE starts authentication in FIG. 3. For the SUCI, refer to the foregoing description. Details are not described herein again. The UE sends the SUCI to the AN device, thereby starting an authentication procedure for the NSWO service.

Optionally, the UE may further send first NSWO indication information to the AN device. The first NSWO indication information indicates a need for performance of authentication for the NSWO service. Correspondingly, the AN device may further receive the first NSWO indication information sent by the UE.

The first NSWO indication information is sent, so that the AN device determines, based on the first NSWO indication information, that authentication for the NSWO service needs to be performed, thereby helping distinguish between different authentication procedures.

Optionally, the first NSWO indication information and the SUCI may be separately in different messages. Alternatively, the first NSWO indication information and the SUCI may be in one message.

The first NSWO indication information and the SUCI are sent by using one message, or the first NSWO indication information and the SUCI are separately sent by using different messages, thereby improving diversity of message procedures. When the first NSWO indication information and the SUCI are sent by using one message, a quantity of air interface messages is reduced.

It should be noted that a message type and a message name of a message that carries the SUCI and/or the first NSWO indication information are not limited in this embodiment. For example, the message type may be an EAP message.

Step 2: The AN device determines an address of the NSWO network element based on the SUCI.

Specifically, after receiving the SUCI sent by the UE, if the AN device determines to perform authentication for the NSWO service, the AN device determines the address of the NSWO network element based on the SUCI.

Optionally, in an implementation for the AN device determining to perform authentication for the NSWO service, if the AN device supports the NSWO service by default, the AN device determines that authentication for the NSWO service needs to be performed when the AN device receives the SUCI sent by the UE. Optionally, in another implementation, if the SUCI indicates a need for performance of authentication for the NSWO service, the AN device determines to perform authentication for the NSWO service. Optionally, in still another implementation, if the AN device further receives the first NSWO indication information, the AN device determines, based on the first NSWO indication information, to perform authentication for the NSWO service.

Optionally, in an implementation, that the AN device determines an address of the NSWO network element based on the SUCI may include:

The AN device obtains a target network identifier and/or a target routing identifier from the SUCI. The target network identifier is an identifier of a home network of the UE, for example, a mobile country code (MCC) and a mobile network code (MNC). The target routing identifier (routing ID) is used to further select a network element related to UE authentication, for example, select the AUSF and/or the UDM.

The AN device obtains the address, corresponding to the target network identifier and/or the target routing identifier, of the NSWO network element based on a mapping relationship between a network identifier and/or a routing identifier and an NSWO network element address.

In this implementation, the AN device may locally store the mapping relationship between a network identifier and/or a routing identifier and an NSWO network element address. Optionally, the mapping relationship between a network identifier and/or a routing identifier and an NSWO network element address may include at least one of the following: a mapping relationship between a network identifier and an NSWO network element address, a mapping relationship between a routing identifier and an NSWO network element address, or a mapping relationship between a network identifier, a routing identifier, and an NSWO network element address. The implementation is easy.

Optionally, in another implementation, that the AN device determines an address of the NSWO network element based on the SUCI may include:

The AN device obtains a target network identifier and/or a target routing identifier from the SUCI.

The AN device sends the target network identifier and/or the target routing identifier to a first address management network element.

The AN device receives the address of the NSWO network element sent by the first address management network element.

In this implementation, the AN device might not locally store a mapping relationship between a network identifier and/or a routing identifier and an NSWO network element address. The address of the NSWO network element is obtained from the first address management network element by sending the target network identifier and/or the target routing identifier to the first address management network element. A name of the first address management network element is not limited in this embodiment. Optionally, the first address management network element may locally store the mapping relationship between a network identifier and/or a routing identifier and an NSWO network element address.

Step 3: The AN device sends a second request message to the NSWO network element based on the address of the NSWO network element. The second request message includes the SUCI. Correspondingly, the NSWO network element receives the second request message sent by the AN device.

Optionally, the second request message may further include NSWO indication information. Optionally, the NSWO indication information may include at least one of the following: the first NSWO indication information or third NSWO indication information. That is, the NSWO indication information is the first NSWO indication information, or the NSWO indication information is the third NSWO indication information, or the NSWO indication information includes the first NSWO indication information and the third NSWO indication information. For the first NSWO indication information and the third NSWO indication information, refer to the foregoing descriptions in this application. Details are not described herein again. For example, the UE sends an EAP-RSP message to the AN device. The EAP-RSP message carries the SUCI. The EAP-RSP message may include the first NSWO indication information, or may not include the first NSWO indication information. After receiving the EAP-RSP message, the AN device may add the third NSWO indication information outside the EAP-RSP message.

The second request message carries the NSWO indication information, so that the NSWO network element determines, based on the NSWO indication information, that authentication for the NSWO service needs to be performed, thereby helping distinguish between different authentication procedures.

Optionally, the second request message may further include an access network identity (AN ID) of the AN device. Optionally, the AN ID is used by the NSWO network element to subsequently send first identification information of the AN device to the AUSF. For details, refer to step 5.

Step 4: The NSWO network element determines, based on the second request message, to perform authentication for the NSWO service.

Optionally, in an implementation, the AN device supports the NSWO service by default, and when the second request message is received from the AN device, it may be determined to perform authentication for the NSWO service.

Optionally, in another implementation, the NSWO network element supports the NSWO service by default, and when the second request message is received from the AN device, it may be determined to perform authentication for the NSWO service.

Optionally, in still another implementation, it may be determined, based on the NSWO indication information included in the second request message, to perform authentication for the NSWO service. For the NSWO indication information included in the second request message, refer to the related description in step 3. Details are not described herein again.

Optionally, in still another implementation, it may be determined, based on the SUCI, to perform authentication for the NSWO service. In this implementation, the SUCI indicates a need for performance of authentication for the NSWO service.

Optionally, in still another implementation, an address or the access network identity of the AN device may be determined based on the second request message, and after it is determined, based on the address or the access network identity of the AN device, that the AN device supports the NSWO service, it is determined to perform authentication for the NSWO service.

Optionally, in still another implementation, the NSWO network element transparently transmits the second request message, and when the second request message is received from the AN device, it may be determined to perform authentication for the NSWO service.

Step 5: The NSWO network element sends a first authentication request message to the AUSF. The first authentication request message includes the SUCI. Correspondingly, the AUSF receives the first authentication request message sent by the NSWO network element.

Specifically, after determining to perform authentication for the NSWO service, the NSWO network element may determine an address of the AUSF based on the SUCI, and the NSWO network element sends the first authentication request message to the AUSF based on the address of the AUSF.

Optionally, in an implementation, that the NSWO network element determines an address of the AUSF based on the SUCI may include:

The NSWO network element obtains a target network identifier and/or a target routing identifier from the SUCI. For the target network identifier, refer to the related description in step 2. The target routing identifier (routing ID) is used to determine the address of the AUSF or the UDM.

The NSWO network element obtains the address, corresponding to the target network identifier and/or the target routing identifier, of the AUSF based on a mapping relationship between a network identifier and/or a routing identifier and an AUSF address.

In this implementation, the NSWO network element may locally store the mapping relationship between a network identifier and/or a routing identifier and an AUSF address. Optionally, the mapping relationship between a network identifier and/or a routing identifier and an AUSF address may include at least one of the following: a mapping relationship between a network identifier and an AUSF address, a mapping relationship between a routing identifier and an AUSF address, or a mapping between a network identifier, a routing identifier, and an AUSF address. The implementation is easy.

Optionally, in another implementation, that the NSWO network element determines an address of the AUSF based on the SUCI may include:

The NSWO network element obtains a target network identifier and/or a target routing identifier from the SUCI.

The NSWO network element sends the target network identifier and/or the target routing identifier to a second address management network element.

The NSWO network element receives the address of the AUSF sent by the second address management network element.

In this implementation, the NSWO network element might not locally store a mapping relationship between a network identifier and/or a routing identifier and an AUSF address. The address of the AUSF is obtained from the second address management network element by sending the target network identifier and/or the target routing identifier to the second address management network element. A name of the second address management network element is not limited in this embodiment. Optionally, the second address management network element may locally store the mapping relationship between a network identifier and/or a routing identifier and an AUSF address.

Optionally, the first authentication request message can further include NSWO indication information. Optionally, the NSWO indication information may include at least one of the following: the first NSWO indication information or fourth NSWO indication information. That is, the NSWO indication information is the first NSWO indication information, or the NSWO indication information is the fourth NSWO indication information, or the NSWO indication information includes the first NSWO indication information and the fourth NSWO indication information. For the first NSWO indication information and the fourth NSWO indication information, refer to the foregoing descriptions in this application. Details are not described herein again.

The first authentication request message carries the NSWO indication information, so that the AUSF determines, based on the NSWO indication information, that authentication for the NSWO service needs to be performed, thereby helping distinguish between different authentication procedures.

Optionally, the first authentication request message can further include first identification information of the AN device. The first identification information is used by the AUSF to subsequently send second identification information of the AN device to the UDM. For details, refer to step 7.

Optionally, the first identification information may be one of the following:

(1) The access network identity (AN ID) of the AN device carried in the second request message. In this implementation, the NSWO network element sends, to the AUSF, the AN ID sent by the AN device.

(2) A serving network name corresponding to the access network identity of the AN device. In this implementation, the NSWO network element may convert the obtained AN ID into the serving network name and send the serving network name to the AUSF.

(3) An access network identity determined based on related information of the AN device. In this implementation, the NSWO network element locally stores the related information of the AN device, determines the access network identity based on the related information, and then sends the access network identity to the AUSF. Specific content of the related information is not limited in this embodiment.

(4) A preset access network identity indicating to perform authentication for the NSWO service.

(5) A preset serving network name indicating to perform authentication for the NSWO service.

Optionally, the first authentication request message may be a request message corresponding to an existing AUSF service. Refer to the foregoing description in this application. Details are not described herein again. In this implementation, the first authentication request message includes information that indicates the AUSF to perform authentication for the NSWO service. Optionally, the information may include at least one of the SUCI or the NSWO indication information.

Optionally, the first authentication request message may be a request message corresponding to a newly added AUSF service. Refer to the foregoing description in this application. Details are not described herein again. In this implementation, the newly added AUSF service directly indicates the AUSF to perform authentication for the NSWO service. Optionally, the first authentication request message might not include the information that indicates the AUSF to perform authentication for the NSWO service. For example, the first authentication request message does not include the NSWO indication information, and the SUCI may be a SUCI used in an existing 5G network. Optionally, the first authentication request message may alternatively include the information that indicates the AUSF to perform authentication for the NSWO service. Optionally, the information may include at least one of the SUCI or the NSWO indication information.

Step 6: The AUSF determines, based on the first authentication request message, to perform authentication for the NSWO service.

Optionally, in an implementation, the NSWO network element supports the NSWO service by default, and when the first authentication request message is received from the NSWO network element, it may be determined to perform authentication for the NSWO service.

Optionally, in another implementation, the AUSF supports the NSWO service by default, and when the first authentication request message is received from the NSWO network element, it may be determined to perform authentication for the NSWO service.

Optionally, in still another implementation, it may be determined, based on the NSWO indication information included in the first authentication request message, to perform authentication for the NSWO service. For the NSWO indication information included in the first authentication request message, refer to the related description in step 5. Details are not described herein again.

Optionally, in still another implementation, it may be determined, based on the SUCI, to perform authentication for the NSWO service. In this implementation, the SUCI indicates a need for performance of authentication for the NSWO service.

Optionally, in still another implementation, when it is determined that the first authentication request message is a request message corresponding to a newly added AUSF service, it is determined to perform authentication for the NSWO service. The newly added AUSF service indicates a need for performance of authentication for the NSWO service. For example, when the first authentication request message is an Nausf_UEAuthentication_NSWO_Authenticate request, the AUSF determines to perform authentication for the NSWO service.

Optionally, in still another implementation, a type or the address of the NSWO network element may be determined based on the first authentication request message, and after it is determined, based on the type or the address of the NSWO network element, that the NSWO network element supports the NSWO service, it is determined to perform authentication for the NSWO service.

Step 7: The AUSF sends a second authentication request message to the UDM. The second authentication request message includes the SUCI. Correspondingly, the UDM receives the second authentication request message sent by the AUSF.

Specifically, after determining to perform authentication for the NSWO service, the AUSF may send the second authentication request message to the UDM.

Optionally, the second authentication request message may further include NSWO indication information. Optionally, the NSWO indication information may include at least one of the following: the first NSWO indication information or fifth NSWO indication information. That is, the NSWO indication information is the first NSWO indication information, or the NSWO indication information is the fifth NSWO indication information, or the NSWO indication information includes the first NSWO indication information and the fifth NSWO indication information. For the first NSWO indication information and the fifth NSWO indication information, refer to the foregoing descriptions in this application. Details are not described herein again.

The second authentication request message carries the NSWO indication information, so that the UDM determines, based on the NSWO indication information, that authentication for the NSWO service needs to be performed, thereby helping distinguish between different authentication procedures.

Optionally, the second authentication request message may further include second identification information of the AN device. The AN device is an AN device connected to the UE. The second identification information may be used by the UDM to subsequently calculate a first EAP-AKA' authentication vector. For details, refer to step 10.

Optionally, the second identification information may be one of the following:

(1) The first identification information carried in the first authentication request message. Refer to the related description in step 5. Details are not described herein again. In this implementation, the AUSF directly sends, to the UDM, the first identification information sent by the NSWO network element.

(2) First information.

Optionally, in an implementation, if the first identification information carried in the first authentication request message is the access network identity of the AN device, the first information is the serving network name corresponding to the access network identity. In this implementation, the first identification information sent by the NSWO network element to the AUSF is the access network identity (AN ID), and the AUSF may convert the obtained AN ID into the serving network name and then send the serving network name to the UDM.

Optionally, in another implementation, if the first authentication request message does not carry the first identification information, the first information is the preset access network identity or the preset serving network name. Both the preset access network identity and the preset serving network name indicate to perform authentication for the NSWO service.

Optionally, the second authentication request message may be a request message corresponding to an existing UDM service. Refer to the foregoing description in this application. Details are not described herein again. In this implementation, the second authentication request message includes information that indicates the UDM to perform authentication for the NSWO service. Optionally, the information may include at least one of the SUCI or the NSWO indication information.

Optionally, the second authentication request message may be a request message corresponding to a newly added UDM service. Refer to the foregoing description in this application. Details are not described herein again. In this implementation, the newly added UDM service directly indicates the UDM to perform authentication for the NSWO service. Optionally, the second authentication request message might not include the information that indicates the UDM to perform authentication for the NSWO service. For example, the second authentication request message does not include the NSWO indication information, and the SUCI may be a SUCI used in an existing 5G network. Optionally, the second authentication request message may alternatively include the information that indicates the UDM to perform authentication for the NSWO service. Optionally, the information may include at least one of the SUCI or the NSWO indication information.

Step 8: The UDM calculates a SUPI based on the SUCI.

This step may be implemented in an existing manner, and is not specifically described.

Step 9: The UDM determines, based on the second authentication request message, to use an EAP-AKA' authentication method.

Optionally, in an implementation, the AUSF supports the NSWO service by default, and when the second authentication request message is received from the AUSF, it may be determined to perform authentication for the NSWO service.

Optionally, in another implementation, when it is determined that the second authentication request message is a request message corresponding to a newly added UDM service, it is determined to perform authentication for the NSWO service. The newly added UDM service indicates a need for performance of authentication for the NSWO service. For example, when the second authentication request message is a Nudm_UEAuthentication_NSWO_Authenticate request, the UDM determines to perform authentication for the NSWO service.

Optionally, in still another implementation, the UDM may determine, based on second information in the second authentication request message, to use the EAP-AKA' authentication method. The second information includes at least one of the following:

(1) The second information is the NSWO indication information, and the NSWO indication information indicates a need for performance of authentication for the NSWO service. For the NSWO indication information included in the second authentication request message, refer to the related description in step 7. Details are not described herein again.

(2) The second information is the SUCI, and the SUCI indicates a need for performance of authentication for the NSWO service.

It can be learned that, in a scenario in which authentication is performed on the UE for the NSWO service in the 5G network, because the AN device supports an EAP-AKA authentication method and the EAP-AKA' authentication method, while the 5G network supports the EAP-AKA' authentication method and a 5G AKA authentication method, that the UDM determines to use the EAP-AKA' authentication method avoids an authentication failure caused when the 5G AKA authentication method is selected, and implements an authentication procedure for the NSWO service in the 5G network.

Optionally, the UDM determines that the UE expects to use the NSWO service, and the UDM determines subscription data of the UE based on the SUPI, and checks, based on the subscription data, whether the UE is allowed to use the NSWO service. If the UE is allowed to use the NSWO service, a further step is performed. Otherwise, the UDM sends a reject message to the AUSF, then the AUSF sends the reject message to the NSWO network element, and then the NSWO network element sends the reject message to the AN device. The reject message carries an indicator indicating that the UE is not authorized to use the NSWO service. Based on the reject message, the AN device rejects the NSWO service request of the UE, or notifies the UE that the UE is not allowed to use the NSWO service, or the UE is not allowed to use the NSWO service in a network corresponding to the AN ID or the serving network name.

Optionally, the UDM determines that the UE expects to use the NSWO service, and the UDM determines subscription data of the UE based on the SUPI, and checks, based on the subscription data and the AN ID or the serving network name, whether the UE is allowed to use the NSWO service in a network corresponding to the AN ID or the serving network name. If the UE is allowed to use the NSWO service, a further step is performed. Otherwise, the UDM sends a reject message to the AUSF, then the AUSF sends the reject message to the NSWO network element, and then the NSWO network element sends the reject message to the AN device. The reject message carries an indicator indicating that the UE is not authorized to use the NSWO service in the network corresponding to the AN ID or the serving network name. Based on the reject message, the AN device rejects the NSWO service request of the UE, or notifies the UE that the UE is not allowed to use the NSWO service, or the UE is not allowed to use the NSWO service in the network corresponding to the AN ID or the serving network name.

Step 10: The UDM obtains a first EAP-AKA' authentication vector (RAND, AUTN, XRES, CK', IK') based on the SUPI.

Specifically, after determining to use the EAP-AKA' authentication method, the UDM may obtain, based on the SUPI and identification information of the AN device, an EAP-AKA' authentication vector, referred to as a first EAP- AKA' authentication vector. The AN device is specifically an AN device accessed by the UE. The first EAP-AKA' authentication vector includes a key CK' and a key IK'.

Optionally, the identification information of the AN device used by the UDM to calculate the first EAP-AKA' authentication vector may be one of the following:

(1) The identification information is the second identification information of the AN device carried in the second authentication request message. Refer to the related description in step 7. Details are not described herein again.

(2) If the second authentication request message does not carry the second identification information of the AN device, the identification information is a preset access network identity or serving network identifier. The preset access network identity or preset serving network identifier indicates a need for performance of authentication for the NSWO service.

(3) If the second authentication request message does not carry the second identification information of the AN device, the identification information is the preset serving network name. The preset serving network name indicates a need for performance of authentication for the NSWO service.

Step 11: The UDM sends a second authentication response message to the AUSF. The second authentication response message includes a second EAP-AKA' authentication vector. Correspondingly, the AUSF receives the second authentication response message sent by the UDM.

The second EAP-AKA' authentication vector is a part obtained after the key CK' and the key IK' are deleted from the first EAP-AKA' authentication vector, that is, (RAND, AUTN, XRES). In other words, the second EAP-AKA' authentication vector does not include the key CK' or the key IK'.

Specifically, when performing the NSWO service, the UE needs to perform authentication for the NSWO service. When performing a non-NSWO service, the UE may perform another authentication procedure, for example, an authentication procedure based on a SIM card. The key CK' and the key IK' are removed from the first EAP-AKA' authentication vector, thereby preventing the key CK' and the key IK' that are newly generated in the authentication process for the NSWO service from affecting a related key already generated by the UE or the AUSF in an existing authentication procedure, and ensuring that the authentication procedure provided in this embodiment is applicable to authentication for the NSWO service.

For the second authentication response message, refer to the foregoing description in this application. Details are not described herein again.

Optionally, the second authentication response message may further include the SUPI.

Step 12: The AUSF sends a first authentication response message to the NSWO network element based on the second authentication response message. The first authentication response message is an authentication response message corresponding to an EAP-AKA' authentication algorithm. Correspondingly, the NSWO network element receives the first authentication response message sent by the AUSF.

Specifically, the AUSF may perform an existing EAP-AKA' authentication procedure, and send the first authentication response message to the NSWO network element. The first authentication response message may include RAND and AUTN. This is not specifically described in this embodiment. The first authentication response message does not include the key CK' or the key IK'.

Optionally, the first authentication response message may include an extensible authentication protocol/authentication and key agreement-challenge (EAP/AKA-challenge).

For the first authentication response message, refer to the foregoing description in this application. Details are not described herein again.

Step 13: The NSWO network element sends a third authentication request message to the UE based on the first authentication response message by using the AN device. The third authentication request message is an authentication request message corresponding to the EAP-AKA' authentication algorithm, and may include RAND and AUTN.

Correspondingly, the UE receives, by using the AN device, the third authentication request message sent by the NSWO network element.

Specifically, the NSWO network element may perform an existing EAP-AKA' authentication procedure, and send the third authentication request message to the UE. This is not specifically described in this embodiment.

Optionally, the third authentication request message may include the EAP/AKA-challenge (RAND, AUTN) sent by the AUSF.

Step 14: The UE performs authentication verification on a network by using the EAP-AKA' authentication algorithm. For example, whether a MAC in AUTN is correct is verified based on RAND, and it is verified whether freshness of an SQN calculated based on RAND and AUTN meets a requirement. Verification on RAND and AUTN belongs to a conventional technology, and is not limited.

Specifically, the UE may perform an existing EAP-AKA' authentication procedure, to perform authentication verification on the network by using the EAP-AKA' authentication algorithm. This is not specifically described in this embodiment.

Step 15: After the authentication verification succeeds, the UE calculates RES, and sends a fourth authentication request message to the NSWO network element by using the AN device. The fourth authentication request message includes RES. Correspondingly, the NSWO network element receives, by using the AN device, the fourth authentication request message sent by the UE.

In a further optional implementation, the UE is internally divided into two parts: a USIM and an ME. The ME may be understood as a part of the UE other than the USIM. The USIM performs security verification on RAND and AUTN. After the USIM performs the verification successfully, the USIM calculates CK, IK, and RES, and sends CK, IK, and RES to the ME. Then, the ME performs an operation corresponding to CK, IK, and RES, for example, calculating CK' and IK' based on CK and IK.

Specifically, the UE may perform an existing EAP-AKA' authentication procedure, and send the fourth authentication request message to the NSWO network element. The fourth authentication request message includes RES. This is not specifically described in this embodiment.

Optionally, the fourth authentication request message may include an EAP/AKA-challenge.

Optionally, after the UE determines in step 15 that the authentication verification succeeds, the method may further include one of the following:

(1) The UE or the ME calculates the key CK' and the key IK', and then deletes the key CK' and the key IK'. In this implementation, the UE calculates the key CK' and the key IK', but then deletes them, thereby preventing the key CK' and the key IK' that are newly generated in the authentication process for the NSWO service from affecting a related key generated by the UE in an existing authentication procedure, and ensuring that the authentication procedure provided in this embodiment is applicable to authentication for the NSWO service.

(2) The UE or the ME calculates the key CK' and the key IK', and forgoes calculating a key $K_{AUSF}$, wherein the key $K_{AUSF}$ is calculated based on the key CK' and the key IK', and then deletes the key CK' and the key IK'. In this implementation, the UE calculates the key CK' and the key IK', but does not calculate the key $K_{AUSF}$, and deletes the key CK' and the key IK', thereby preventing the key CK' and the key IK' that are newly generated in the authentication process for the NSWO service from affecting a related key generated by the UE in an existing authentication procedure.

(3) The UE or the ME calculates the key CK' and the key IK', and calculates the key $K_{AUSF}$ based on the key CK' and the key IK', and then deletes the key CK' and the key IK', and deletes the key $K_{AUSF}$. In this implementation, the UE calculates the key CK', the key IK', and the key $K_{AUSF}$, but then deletes them all, thereby preventing the key CK' and the key IK' that are newly generated in the authentication process for the NSWO service from affecting a related key generated by the UE in an existing authentication procedure.

(4) The UE or the ME calculates the key CK' and the key IK', and calculates the key $K_{AUSF}$ based on the key CK' and the key IK', and then deletes the key CK' and the key IK', and forgoes replacing a key $K_{AUSF}$ stored locally in the UE. In this implementation, the UE calculates the key CK', the key IK', and the key $K_{AUSF}$, but then deletes the key CK' and the key IK'. Although the key $K_{AUSF}$ is newly generated, the key $K_{AUSF}$ stored locally in the UE is not replaced. It may be understood that the newly generated key $K_{AUSF}$ is not used. Therefore, the newly generated key does not affect a related key generated by the UE in an existing authentication procedure.

(5) The UE or the ME forgoes calculating the key CK' and the key IK'. In this implementation, the UE does not calculate the key CK' or the key IK', thereby preventing the key CK' and the key IK' that are newly generated in the authentication process for the NSWO service from affecting a related key generated by the UE in an existing authentication procedure.

Optionally, the ME sends $K_{AUSF}$ to the USIM to replace an old $K_{AUSF}$ stored in the USIM card.

(6) After determining that the authentication is performed for the NSWO service, the ME also sends an authentication indicator to the USIM card when sending RAND and AUTN to the USIM card. Optionally, the authentication indicator indicates that the USIM card does not need to send CK or IK after the verification succeeds, or indicates to the USIM card that an authentication-only service is performed, or the like. After the USIM performs the verification successfully, the USIM calculates only RES based on the authentication indicator, and sends RES to the ME. Alternatively, based on the authentication indicator, the USIM does not calculate CK or IK, or even if CK and IK are calculated, the USIM does not send CK or IK to the ME. In this case, the ME cannot obtain CK or IK, and does not calculate CK' or IK' based on CK and IK.

(7) The ME sends RAND and AUTN to the USIM card, and the USIM performs an operation normally, and sends CK, IK, and RES to the ME. In this case, the ME performs authentication based on the NSWO service. Optionally, the ME may discard or delete CK and IK, or does not perform other additional use, for example, calculating CK' and IK' based on CK and IK. This prevents the key CK' and the key IK' that are newly generated in the authentication process for the NSWO service from affecting a related key generated by the UE in an existing authentication procedure, and ensures that the authentication procedure provided in this embodiment is applicable to authentication for the NSWO service.

Step 16: The NSWO network element sends a fifth authentication request message to the AUSF based on the fourth authentication request message. Correspondingly, the AUSF receives the fifth authentication request message sent by the NSWO network element.

Specifically, the NSWO network element may perform an existing EAP-AKA' authentication procedure, and send the fifth authentication request message to the AUSF. This is not specifically described in this embodiment.

Optionally, the fifth authentication request message may include the EAP/AKA-challenge sent by the UE.

Optionally, the fifth authentication request message may be a Nausf_UEAuthentication_Authenticate request.

Step 17: The AUSF performs authentication on the UE based on the fifth authentication request message. For example, it is verified whether RES and XRES are equal. If they are equal, the verification succeeds. Otherwise, the verification fails.

Specifically, the AUSF may perform an existing EAP-AKA' authentication procedure, to perform authentication on the UE. This is not specifically described in this embodiment.

Step 18: After the authentication verification, the AUSF sends a first message to the NSWO network element. Correspondingly, the NSWO network element receives the first message sent by the AUSF. The first message includes an authentication verification result.

Step 19: The NSWO network element sends a second message to the AN device based on the first message. Correspondingly, the AN device receives the second message sent by the NSWO network element.

Step 20: Optionally, if the authentication verification succeeds, the AN device sends an NSWO service indication message to the UE. Alternatively, the AN device may perform an operation corresponding to the NSWO service after determining that the authentication succeeds.

Step 21: If the authentication verification fails, the AN device sends a reject message to the UE.

Step 17 to step 21 are steps in an existing EAP-AKA' authentication procedure. For related messages, refer to the foregoing descriptions in this application. Details are not described herein again.

It can be learned that this embodiment provides an authentication procedure applicable to a case in which UE performs an NSWO service in a 5G network, and related network elements include the UE, an AN device, an NSWO network element, an AUSF, and a UDM. After determining to perform authentication for the NSWO service, the UDM determines to use an EAP-AKA' authentication method, thereby avoiding an authentication failure caused by selecting a 5G AKA authentication method. In addition, after calculating an EAP-AKA' authentication vector by using the EAP-AKA' authentication method, the UDM deletes a key CK' and a key IK' from the EAP-AKA' authentication vector, and then sends the EAP-AKA' authentication vector to the AUSF, thereby preventing the key CK' and the key IK' that are newly generated in the authentication process for the NSWO service from affecting a related key already generated by the UE or the AUSF in an existing authentication procedure, and avoiding impact on an existing key architecture of the UE or the AUSF. Further, after performing authentication verification on a network successfully, the UE may not calculate the key CK' or the key IK', or delete the calculated key CK' and key IK' or key $K_{AUSF}$, or after the key $K_{AUSF}$ is calculated, the newly generated key $K_{AUSF}$ is not used to replace a locally existing key $K_{AUSF}$, thereby avoiding impact on an existing key architecture of the UE.

Figure 5A:
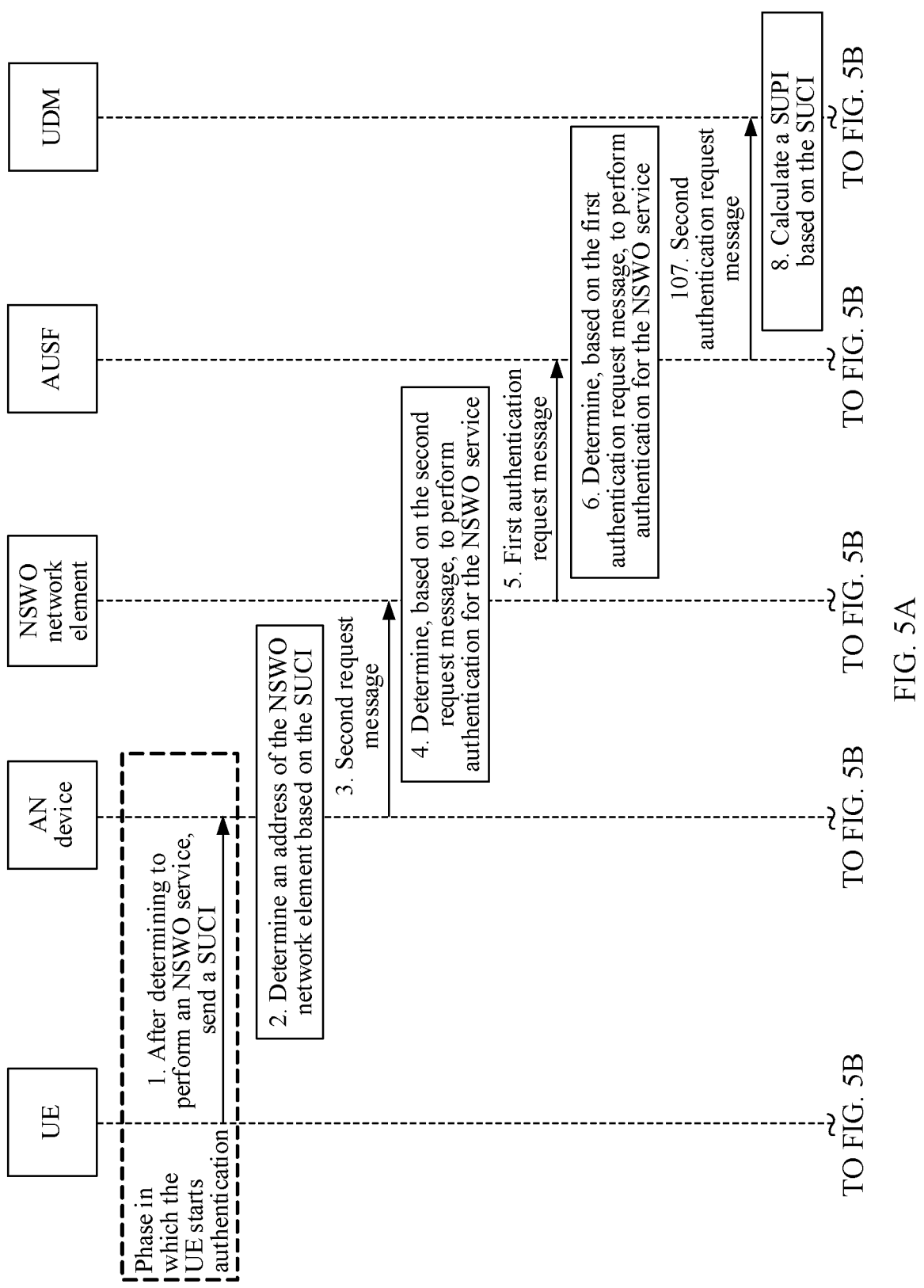
FIG. 5A and FIG. 5B are another diagram of message exchange of a method for authentication for an NSWO service according to an embodiment of this application.
Figure 5B:
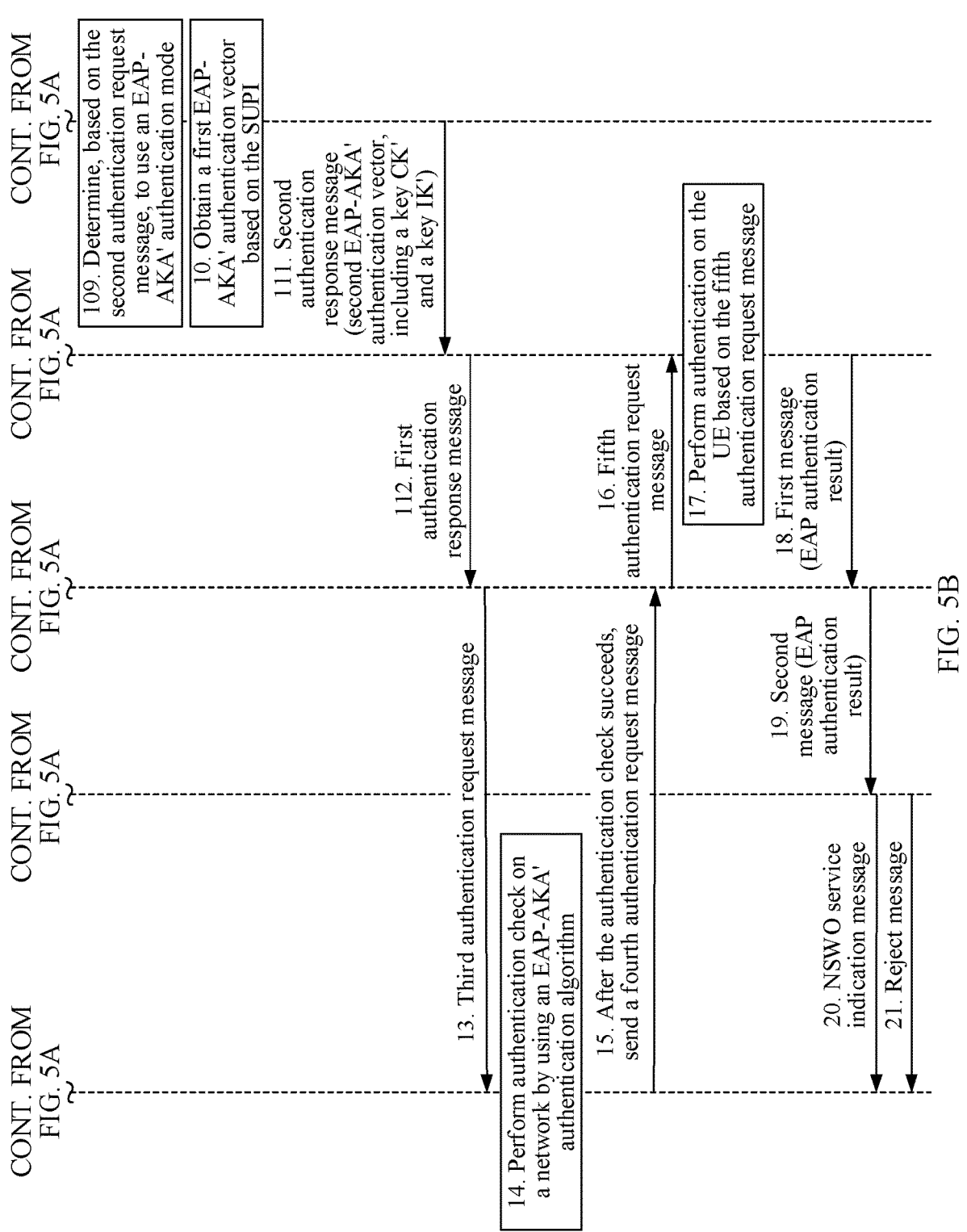

FIG. 5A and FIG. 5B are another diagram of message exchange of a method for authentication for an NSWO service according to an embodiment of this application. The method for authentication for an NSWO service that is provided in this embodiment is performed by UE, an AN device, an NSWO network element, an AUSF, and a UDM. A difference between this embodiment and the embodiment shown in FIG. 4A and FIG. 4B lies in that, the UDM sends a complete EAP-AKA' authentication vector to the AUSF after calculating the EAP-AKA' authentication vector by using an EAP-AKA' authentication method. In this way, the AUSF or the UE may use a key CK', a key IK', or a key $K_{AUSF}$ that is newly generated in an authentication process for the NSWO service. Certainly, the AUSF or the UE may alternatively not use the newly generated key CK', key IK', or key $K_{AUSF}$.

As shown in FIG. 5A and FIG. 5B, the method for authentication for an NSWO service that is provided in this embodiment may include the following steps.

Step 1: After the UE determines to perform the NSWO service, the UE sends a SUCI to the AN device. Correspondingly, the AN device receives the SUCI sent by the UE.

Step 2: The AN device determines an address of the NSWO network element based on the SUCI.

Step 3: The AN device sends a second request message to the NSWO network element based on the address of the NSWO network element. The second request message includes the SUCI. Correspondingly, the NSWO network element receives the second request message sent by the AN device.

Step 4: The NSWO network element determines, based on the second request message, to perform authentication for the NSWO service.

Step 5: The NSWO network element sends a first authentication request message to the AUSF. The first authentication request message includes the SUCI. Correspondingly, the AUSF receives the first authentication request message sent by the NSWO network element.

Step 6: The AUSF determines, based on the first authentication request message, to perform authentication for the NSWO service.

For step 1 to step 6, refer to the embodiment shown in FIG. 4A and FIG. 4B. Details are not described herein again.

Step 107: The AUSF sends a second authentication request message to the UDM. The second authentication request message includes the SUCI. Correspondingly, the UDM receives the second authentication request message sent by the AUSF.

Specifically, after determining to perform authentication for the NSWO service, the AUSF may send the second authentication request message to the UDM.

Optionally, the second authentication request message may further include NSWO indication information. Optionally, the NSWO indication information may include at least one of the following: first NSWO indication information or fifth NSWO indication information. That is, the NSWO indication information is the first NSWO indication information, or the NSWO indication information is the fifth NSWO indication information, or the NSWO indication information includes the first NSWO indication information and the fifth NSWO indication information. For the first NSWO indication information and the fifth NSWO indication information, refer to the foregoing descriptions in this application. Details are not described herein again.

The second authentication request message carries the NSWO indication information, so that the UDM determines, based on the NSWO indication information, that authentication for the NSWO service needs to be performed, thereby helping distinguish between different authentication procedures.

Optionally, the second authentication request message may further include second identification information of the AN device. The AN device is an AN device connected to the UE. The second identification information may be used by the UDM to subsequently calculate a first EAP-AKA' authentication vector.

Optionally, the second identification information may be one of the following:

(1) First identification information carried in the first authentication request message. Refer to the related description in step 5. Details are not described herein again. In this implementation, the AUSF directly sends, to the UDM, the first identification information sent by the NSWO network element.

(2) First information.

Optionally, in an implementation, if the first identification information carried in the first authentication request message is an access network identity of the AN device, the first information is a serving network name corresponding to the access network identity. In this implementation, the first identification information sent by the NSWO network element to the AUSF is the access network identity (AN ID), and the AUSF may convert the obtained AN ID into the serving network name and send the serving network name to the UDM.

Optionally, in another implementation, if the first authentication request message does not carry the first identification information, the first information is a preset access network identity or a preset serving network name. Both the preset access network identity and the preset serving network name indicate to perform authentication for the NSWO service.

Optionally, the second authentication request message may be a request message corresponding to an existing UDM service. Refer to the foregoing description in this application. Details are not described herein again. In this case, optionally, in an implementation, the second authentication request message includes information that indicates the UDM to perform authentication for the NSWO service. Optionally, the information may include at least one of the SUCI or the NSWO indication information.

Optionally, in another implementation, after determining to perform authentication for the NSWO service, the AUSF further determines to use an EAP-AKA' authentication algorithm. Correspondingly, the second authentication request message further includes algorithm indication information, to indicate to perform EAP-AKA' authentication. The algorithm indication information is carried, so that the UDM can directly determine to use an EAP-AKA' authentication method, thereby simplifying processing complexity of selecting an authentication algorithm by the UDM.

Optionally, the second authentication request message may be a request message corresponding to a newly added UDM service. Refer to the foregoing description in this application. Details are not described herein again. In this implementation, the newly added UDM service directly indicates the UDM to perform authentication for the NSWO service. Optionally, the second authentication request message might not include the information that indicates the UDM to perform authentication for the NSWO service. For example, the second authentication request message does not include the NSWO indication information, and the SUCI may be a SUCI used in an existing 5G network. Optionally, the second authentication request message may alternatively include the information that indicates the UDM to perform authentication for the NSWO service. Optionally, the information may include at least one of the SUCI or the NSWO indication information.

Optionally, after determining to perform authentication for the NSWO service, the AUSF further determines to use the EAP-AKA' authentication algorithm. The second authentication request message may include the algorithm indication information, or may not include the algorithm indication information.

Step 8: The UDM calculates a SUPI based on the SUCI.

Refer to the embodiment shown in FIG. 4A and FIG. 4B. Details are not described herein again.

Step 109: The UDM determines, based on the second authentication request message, to use the EAP-AKA' authentication method.

Optionally, in an implementation, the AUSF supports the NSWO service by default, and when the second authentication request message is received from the AUSF, it may be determined to perform authentication for the NSWO service.

Optionally, in another implementation, when it is determined that the second authentication request message is a request message corresponding to a newly added UDM service, it is determined to perform authentication for the NSWO service. The newly added UDM service indicates a need for performance of authentication for the NSWO service. For example, when the second authentication request message is a Nudm_UEAuthentication_NSWO_Authenticate request, the UDM determines to perform authentication for the NSWO service.

Optionally, in still another implementation, the UDM may determine, based on second information in the second authentication request message, to use the EAP-AKA' authentication method. The second information includes at least one of the following:

(1) The second information is the NSWO indication information, and the NSWO indication information indicates a need for performance of authentication for the NSWO service. For the NSWO indication information included in the second authentication request message, refer to the related description in step 7. Details are not described herein again.

(2) The second information is the SUCI, and the SUCI indicates a need for performance of authentication for the NSWO service.

(3) The second information is the algorithm indication information, and the algorithm indication information indicates a need for performance of EAP-AKA' authentication.

It can be learned that, in a scenario in which authentication is performed on the UE for the NSWO service in the 5G network, because the AN device supports an EAP-AKA authentication method and the EAP-AKA' authentication method, while the 5G network supports the EAP-AKA' authentication method and a 5G AKA authentication method, that the UDM determines to use the EAP-AKA' authentication method avoids an authentication failure caused when the 5G AKA authentication method is selected, and implements an authentication procedure for the NSWO service in the 5G network.

Optionally, the UDM determines that the UE expects to use the NSWO service, and the UDM determines subscription data of the UE based on the SUPI, and checks, based on the subscription data, whether the UE is allowed to use the NSWO service. If the UE is allowed to use the NSWO service, a further step is performed. Otherwise, the UDM sends a reject message to the AUSF, then the AUSF sends the reject message to the NSWO network element, and then the NSWO network element sends the reject message to the AN device. The reject message carries an indicator indicating that the UE is not authorized to use the NSWO service. Based on the reject message, the AN device rejects the NSWO service request of the UE, or notifies the UE that the UE is not allowed to use the NSWO service, or the UE is not allowed to use the NSWO service in a network corresponding to the AN ID or the serving network name.

Optionally, the UDM determines that the UE expects to use the NSWO service, and the UDM determines subscription data of the UE based on the SUPI, and checks, based on the subscription data and the AN ID or the serving network name, whether the UE is allowed to use the NSWO service in a network corresponding to the AN ID or the serving network name. If the UE is allowed to use the NSWO service, a further step is performed. Otherwise, the UDM sends a reject message to the AUSF, then the AUSF sends the reject message to the NSWO network element, and then the NSWO network element sends the reject message to the AN device. The reject message carries an indicator indicating that the UE is not authorized to use the NSWO service in the network corresponding to the AN ID or the serving network name. Based on the reject message, the AN device rejects the NSWO service request of the UE, or notifies the UE that the UE is not allowed to use the NSWO service, or the UE is not allowed to use the NSWO service in the network corresponding to the AN ID or the serving network name.

Step 10: The UDM obtains a first EAP-AKA' authentication vector (RAND, AUTN, XRES, CK', IK') based on the SUPI.

Refer to the embodiment shown in FIG. 4A and FIG. 4B. Details are not described herein again.

Step 111: The UDM sends a second authentication response message to the AUSF. The second authentication response message includes a second EAP-AKA' authentication vector. Correspondingly, the AUSF receives the second authentication response message sent by the UDM.

The second EAP-AKA' authentication vector is the first EAP-AKA' authentication vector, and the second EAP-AKA' authentication vector includes a key CK' and a key IK'.

The complete EAP-AKA' authentication vector is carried in the second authentication response message and sent to the AUSF, so that the AUSF can use the key CK' and the key IK' that are newly generated in the authentication process for the NSWO service, thereby improving flexibility of a key use manner.

For the second authentication response message, refer to the foregoing description in this application. Details are not described herein again.

Optionally, the second authentication response message may further include the SUPI.

Step 112: The AUSF sends a first authentication response message to the NSWO network element based on the second authentication response message. The first authentication response message is an authentication response message corresponding to the EAP-AKA' authentication algorithm. Correspondingly, the NSWO network element receives the first authentication response message sent by the AUSF.

Specifically, the AUSF may perform an existing EAP-AKA' authentication procedure, and send the first authentication response message to the NSWO network element. This is not specifically described in this embodiment. The second EAP-AKA' authentication vector carried in the second authentication response message received by the AUSF is a complete EAP-AKA' authentication vector, and includes the key CK' and the key IK'.

Optionally, in an implementation, the sending the first authentication response message to the NSWO network element based on the second authentication response message may include:

sending the first authentication response message to the NSWO network element, where the first authentication response message includes the RAND and the AUTN.

In this implementation, the AUSF deletes the key CK' and the key IK' from the second EAP-AKA' authentication vector, thereby preventing the key CK' and the key IK' that are newly generated in the authentication process for the NSWO service from affecting a related key already generated by the UE in an existing authentication procedure.

Optionally, the first authentication response message may include an EAP/AKA-challenge (RAND, AUTN).

For the first authentication response message, refer to the foregoing description in this application. Details are not described herein again.

Step 13: The NSWO network element sends a third authentication request message to the UE based on the first authentication response message by using the AN device. The third authentication request message is an authentication request message corresponding to the EAP-AKA' authentication algorithm. Correspondingly, the UE receives, by using the AN device, the third authentication request message sent by the NSWO network element.

Step 14: The UE performs authentication verification on a network by using the EAP-AKA' authentication algorithm. For example, whether a MAC in AUTN is correct is verified based on RAND, and it is verified whether freshness of an SQN calculated based on RAND and AUTN meets a requirement. Verification on RAND and AUTN belongs to a conventional technology, and is not limited.

Step 15: After the authentication verification succeeds, the UE calculates RES, and sends a fourth authentication request message to the NSWO network element by using the AN device. The fourth authentication request message includes RES. Correspondingly, the NSWO network element receives, by using the AN device, the fourth authentication request message sent by the UE.

In a further optional implementation, the UE is internally divided into two parts: a USIM and an ME. The ME may be understood as a part of the UE other than the USIM. The USIM performs security verification on RAND and AUTN.

After the USIM performs the verification successfully, the USIM calculates CK, IK, and RES, and sends CK, IK, and RES to the ME. Then, the ME performs an operation corresponding to CK, IK, and RES, for example, calculating CK' and IK' based on CK and IK.

For step 13 to step 15, refer to the embodiment shown in FIG. 4A and FIG. 4B. Details are not described herein again.

Optionally, after the UE, the USIM, or the ME determines in step 15 that the authentication verification succeeds, the method may further include one of the following:

(1) The UE or the ME calculates the key CK' and the key IK', and then deletes the key CK' and the key IK'. In this implementation, the UE calculates the key CK' and the key IK', but then deletes them, thereby preventing the key CK' and the key IK' that are newly generated in the authentication process for the NSWO service from affecting a related key generated by the UE in an existing authentication procedure, and ensuring that the authentication procedure provided in this embodiment is applicable to authentication for the NSWO service.

(2) The UE or the ME calculates the key CK' and the key IK', and forgoes calculating a key $K_{AUSF}$, wherein the key $K_{AUSF}$ is calculated based on the key CK' and the key IK', and then deletes the key CK' and the key IK'. In this implementation, the UE calculates the key CK' and the key IK', but does not calculate the key $K_{AUSF}$, and deletes the key CK' and the key IK', thereby preventing the key CK' and the key IK' that are newly generated in the authentication process for the NSWO service from affecting a related key generated by the UE in an existing authentication procedure.

(3) The UE or the ME calculates the key CK' and the key IK', and calculates the key $K_{AUSF}$ based on the key CK' and the key IK', and then deletes the key CK' and the key IK', and deletes the key $K_{AUSF}$. In this implementation, the UE calculates the key CK', the key IK', and the key $K_{AUSF}$, but then deletes them all, thereby preventing the key CK' and the key IK' that are newly generated in the authentication process for the NSWO service from affecting a related key generated by the UE in an existing authentication procedure.

(4) The UE or the ME calculates the key CK' and the key IK', and calculates the key $K_{AUSF}$ based on the key CK' and the key IK', and then deletes the key CK' and the key IK', and forgoes replacing a key $K_{AUSF}$ stored locally in the UE. In this implementation, the UE calculates the key CK', the key IK', and the key $K_{AUSF}$, but then deletes the key CK' and the key IK'. Although the key $K_{AUSF}$ is newly generated, the key $K_{AUSF}$ stored locally in the UE is not replaced. It may be understood that the newly generated key $K_{AUSF}$ is not used. Therefore, the newly generated key does not affect a related key generated by the UE in an existing authentication procedure.

(5) The UE or the ME forgoes calculating the key CK' and the key IK'. In this implementation, the UE does not calculate the key CK' or the key IK', thereby preventing the key CK' and the key IK' that are newly generated in the authentication process for the NSWO service from affecting a related key generated by the UE in an existing authentication procedure.

(6) The UE or the ME calculates the key CK' and the key IK', calculates the key $K_{AUSF}$ based on the key CK' and the key IK', and then replaces the key $K_{AUSF}$ stored locally in the UE. In this implementation, the UE calculates the key CK', the key IK', and the key $K_{AUSF}$, and replaces the key $K_{AUSF}$ stored locally in the UE, namely, replaces the locally stored key $K_{AUSF}$ with the newly generated key $K_{AUSF}$. Subsequently, the UE may use the newly generated key $K_{AUSF}$. Optionally, the ME sends $K_{AUSF}$ to the USIM to replace an old $K_{AUSF}$ stored in the USIM card.

(7) After determining that the authentication is performed for the NSWO service, the ME also sends an authentication indicator to the USIM card when sending RAND and AUTN to the USIM card. Optionally, the authentication indicator indicates that the USIM card does not need to send CK or IK after the verification succeeds, or indicates to the USIM card that an authentication-only service is performed, or the like. After the USIM performs the verification successfully, the USIM calculates only RES based on the authentication indicator, and sends RES to the ME. Alternatively, based on the authentication indicator, the USIM does not calculate CK or IK, or even if CK and IK are calculated, the USIM does not send CK or IK to the ME. In this case, the ME cannot obtain CK or IK, and does not calculate CK' or IK' based on CK and IK.

(8) The ME sends RAND and AUTN to the USIM card, and the USIM performs an operation normally, and sends CK, IK, and RES to the ME. In this case, the ME performs authentication based on the NSWO service. Optionally, the ME may discard or delete CK and IK, or does not perform other additional use. This prevents the key CK' and the key IK' that are newly generated in the authentication process for the NSWO service from affecting a related key generated by the UE in an existing authentication procedure, and ensures that the authentication procedure provided in this embodiment is applicable to authentication for the NSWO service.

Step 16: The NSWO network element sends a fifth authentication request message to the AUSF based on the fourth authentication request message. Correspondingly, the AUSF receives the fifth authentication request message sent by the NSWO network element.

Step 17: The AUSF performs authentication on the UE based on the fifth authentication request message. For example, it is verified whether RES and XRES are equal. If they are equal, the verification succeeds. Otherwise, the verification fails.

Step 18: After the authentication verification, the AUSF sends a first message to the NSWO network element. Correspondingly, the NSWO network element receives the first message sent by the AUSF. The first message includes an authentication verification result.

For step 16 to step 18, refer to the embodiment shown in FIG. 4A and FIG. 4B. Details are not described herein again.

Optionally, in step 112, if the first authentication response message includes the second EAP-AKA' authentication vector carried in the second authentication response message, that is, the AUSF does not delete the key CK' and the key IK' that are received from the UDM, after the AUSF determines in step 18 that the authentication verification succeeds, the method may further include one of the following:

(1) The AUSF forgoes calculating a key $K_{AUSF}$, wherein the key $K_{AUSF}$ is calculated based on the key CK' and the key IK'. In this implementation, the AUSF does not calculate the new key $K_{AUSF}$ based on the new key CK' and key IK', thereby preventing the key $K_{AUSF}$ newly generated in the authentication process for the NSWO service from affecting a related key already generated by the AUSF in an existing authentication procedure.

(2) The AUSF calculates the key $K_{AUSF}$ based on the key CK' and the key IK', and forgoes replacing a key $K_{AUSF}$ stored locally in the AUSF. In this implementation, the AUSF calculates the new key $K_{AUSF}$ based on the new key CK' and the key IK', but does not replace the key $K_{AUSF}$ stored locally in the AUSF. It may be understood that the key $K_{AUSF}$ newly generated in the authentication process for the NSWO service is not used. Therefore, the newly generated key $K_{AUSF}$ does not affect a related key generated by the AUSF in an existing authentication procedure.

Optionally, the method may further include at least one of the following:

(1) The AUSF deletes the key CK' and the key IK'. In this implementation, the AUSF deletes the key CK' and the key IK' that are received in the authentication process for the NSWO service, thereby preventing the newly generated key CK' and key IK' from affecting a related key generated by the AUSF in an existing authentication procedure.

(2) The AUSF deletes the generated key $K_{AUSF}$. In this implementation, the AUSF deletes the key $K_{AUSF}$ newly generated in the authentication process for the NSWO service, thereby preventing the newly generated key $K_{AUSF}$ from affecting a related key generated by the AUSF in an existing authentication procedure.

Step 19: The NSWO network element sends a second message to the AN device based on the first message. Correspondingly, the AN device receives the second message sent by the NSWO network element.

Step 20: Optionally, if the authentication verification succeeds, the AN device sends an NSWO service indication message to the UE. Alternatively, the AN may perform an operation corresponding to the NSWO service after determining that the authentication succeeds.

Step 21: If the authentication verification fails, the AN device sends a reject message to the UE.

For step 19 to step 21, refer to the embodiment shown in FIG. 4A and FIG. 4B. Details are not described herein again.

It can be learned that this embodiment provides an authentication procedure applicable to a case in which UE performs an NSWO service in a 5G network, and related network elements include the UE, an AN device, an NSWO network element, an AUSF, and a UDM. The UDM determines to use an EAP-AKA' authentication method, thereby avoiding an authentication failure caused by selecting a 5G AKA authentication method. In addition, after calculating an EAP-AKA' authentication vector by using the EAP-AKA' authentication method, the UDM sends the complete EAP-AKA' authentication vector to the AUSF, thereby reducing changes to a processing manner of the UDM, reducing impact on the UDM, and making it possible for the AUSF or the UE to subsequently use a key CK', a key IK', or a key $K_{AUSF}$ that is newly generated in the authentication process for the NSWO service. Further, after performing authentication verification on a network successfully, the UE may not calculate a key CK' or a key IK', or delete the calculated key CK' and key IK' or key $K_{AUSF}$, or after the key $K_{AUSF}$ is calculated, the newly generated key $K_{AUSF}$ is not used to replace a locally existing key $K_{AUSF}$, thereby avoiding impact on an existing key architecture of the UE. Alternatively, after performing authentication verification on the network successfully, the UE calculates the key $K_{AUSF}$ and replaces the locally existing key $K_{AUSF}$, so that the new key $K_{AUSF}$ can be used. Further, after receiving the key CK' and the key IK' from the UDM, the AUSF may delete a calculated key $K_{AUSF}$, or after the key $K_{AUSF}$ is calculated, the newly generated key $K_{AUSF}$ is not used to replace a locally existing key $K_{AUSF}$, thereby avoiding impact on an existing key architecture of the AUSF. Alternatively, the AUSF calculates the key $K_{AUSF}$ and replaces the locally existing key $K_{AUSF}$, so that the new key $K_{AUSF}$ can be used.

Optionally, based on the foregoing embodiments, another embodiment of this application provides a specific implementation of the phase in which the UE starts authentication in FIG. 3 to FIG. 5A and FIG. 5B.

Figure 6:
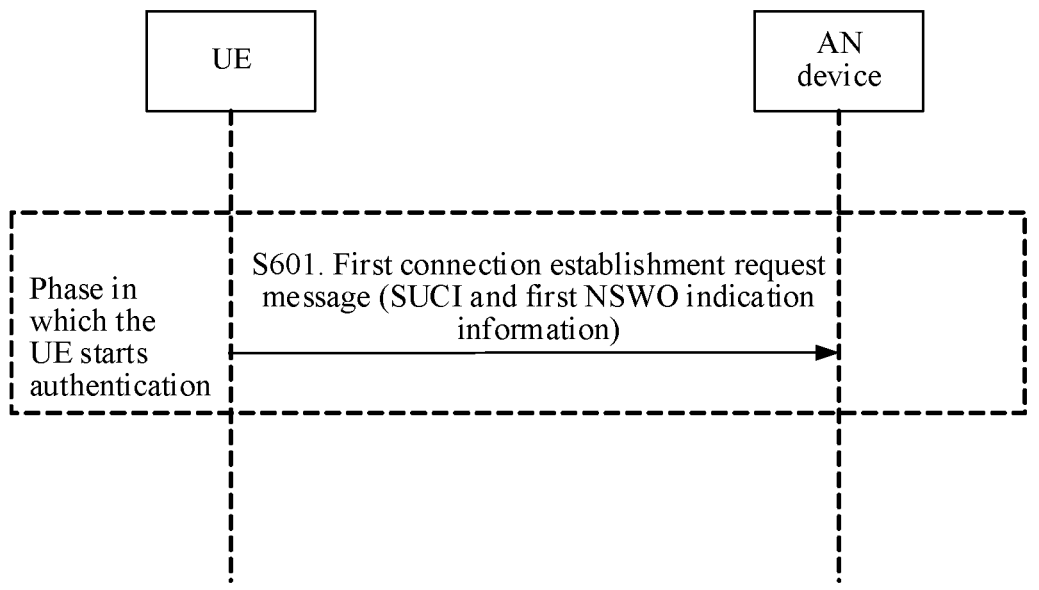
FIG. 6 is still another diagram of message exchange of a method for authentication for an NSWO service according to an embodiment of this application.

Optionally, in an implementation, FIG. 6 is still another diagram of message exchange of a method for authentication for an NSWO service according to an embodiment of this application. As shown in FIG. 6, in step 1, that the UE sends a SUCI to the AN device may include the following step:

S601: The UE sends a first connection establishment request message to the AN device. The first connection establishment request message includes a SUCI and first NSWO indication information. Correspondingly, the AN device receives the first connection establishment request message sent by the UE.

Optionally, the first connection establishment request message may be an EAP message.

Optionally, the SUCI may be an existing SUCI generated based on a SUPI, for example, a SUCI used in a 5G network.

Optionally, the SUCI may indicate to perform authentication for the NSWO service.

Optionally, the first NSWO indication information may be carried in the EAP message, or may be carried outside the EAP message.

In this implementation, after determining to perform the NSWO service, the UE accesses the AN to establish a connection. The first connection establishment request message carries both the SUCI and the first NSWO indication information, to start an authentication procedure for the NSWO service, thereby reducing a quantity of air interface messages.

Figure 7:
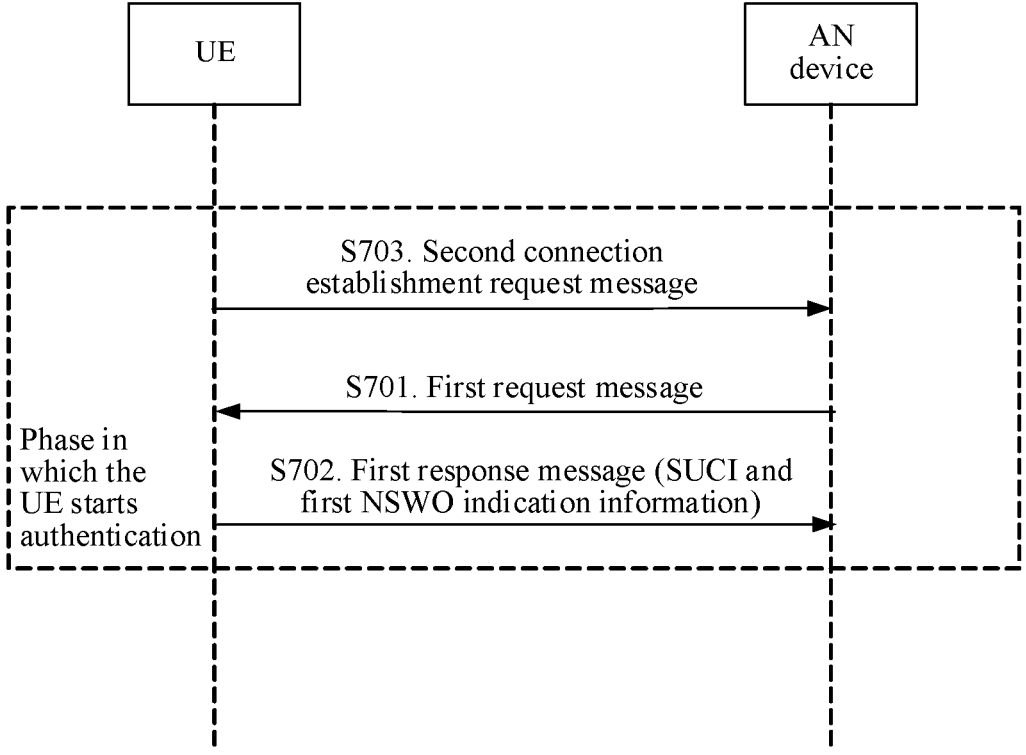
FIG. 7 is still another diagram of message exchange of a method for authentication for an NSWO service according to an embodiment of this application.

Optionally, in another implementation, FIG. 7 is still another diagram of message exchange of a method for authentication for an NSWO service according to an embodiment of this application. As shown in FIG. 7, in step 1, that the UE sends a SUCI to the AN device may include the following steps:

S701: The AN device sends a first request message to the UE. Correspondingly, the UE receives the first request message sent by the AN device.

S702: The UE sends a first response message to the AN device. The first response message includes first NSWO indication information and a SUCI. Correspondingly, the AN device receives the first response message sent by the UE.

In this implementation, the AN device sends the first request message to the UE, to trigger the UE to perform EAP authentication. After determining to perform the NSWO service, the UE receives the first request message, determines to perform EAP authentication, and determines to perform authentication for the NSWO service.

Optionally, the first request message and the first response message may be EAP messages. For example, the first request message is an extensible authentication protocol-request/identity message (EAP-REQ/Identity). The first response message is an extensible authentication protocol-response message (EAP-RSP).

Optionally, the SUCI may be an existing SUCI generated based on a SUPI, for example, a SUCI used in a 5G network.

Optionally, the SUCI may indicate to perform authentication for the NSWO service.

Optionally, the first NSWO indication information may be carried in the EAP message, or may be carried outside the EAP message.

Optionally, before S701, the method may further include:

S703: The UE sends a second connection establishment request message to the AN device. Correspondingly, the AN device receives the second connection establishment request message sent by the UE.

Optionally, the second connection establishment request message may be an EAP message.

Optionally, the second connection establishment request message may include the first NSWO indication information. Specifically, the UE adds the first NSWO indication information to the second connection establishment request message, so that the AN device determines that authentication for the NSWO service needs to be performed, and the AN device triggers the UE to perform EAP authentication.

Figure 8:
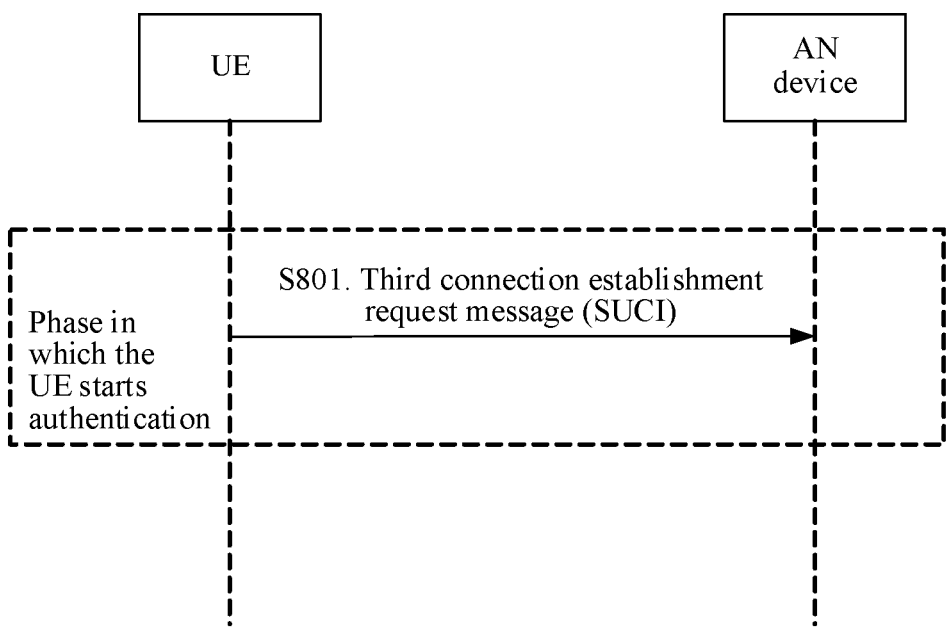
FIG. 8 is still another diagram of message exchange of a method for authentication for an NSWO service according to an embodiment of this application.

Optionally, in still another implementation, FIG. 8 is still another diagram of message exchange of a method for authentication for an NSWO service according to an embodiment of this application. As shown in FIG. 8, in step 1, that the UE sends a SUCI to the AN device may include the following step:

S801: The UE sends a third connection establishment request message to the AN device. The third connection establishment request message includes a SUCI, and the SUCI indicates a need for performance of authentication for the NSWO service. Correspondingly, the AN device receives the third connection establishment request message sent by the UE.

Optionally, the third connection establishment request message may be an EAP message.

In this implementation, after determining to perform the NSWO service, the UE accesses the AN to establish a connection. The third connection establishment request message carries the SUCI indicating to perform authentication for the NSWO service, to start an authentication procedure for the NSWO service, thereby reducing a quantity of air interface messages.

Figure 9:
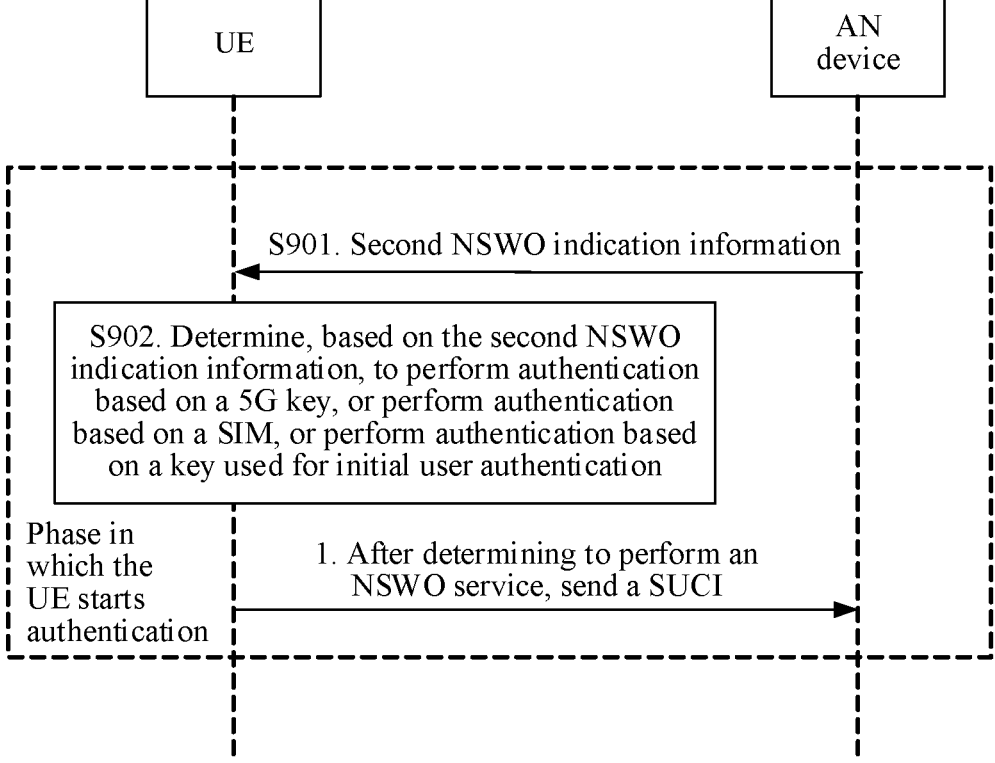
FIG. 9 is still another diagram of message exchange of a method for authentication for an NSWO service according to an embodiment of this application.

Optionally, FIG. 9 is still another diagram of message exchange of a method for authentication for an NSWO service according to an embodiment of this application. As shown in FIG. 9, before step 1, the method for authentication for an NSWO service that is provided in this embodiment may further include the following steps:

S901: The AN device sends second NSWO indication information to the UE. The second NSWO indication information indicates that the AN device supports the NSWO service. Correspondingly, the UE receives the second NSWO indication information sent by the AN device.

S902: The UE determines, based on the second NSWO indication information, to perform authentication based on a 5G key, or perform authentication based on a SIM, or perform authentication based on a key used for initial user authentication.

In this implementation, the AN device sends the second NSWO indication information to the UE, to notify the UE that the AN device supports the NSWO service, so that authentication for the NSWO service can be implemented.

The second NSWO indication information may be carried in a message sent by the AN device to the UE. A type and a name of the message are not limited in this embodiment. Optionally, the message may be a broadcast message sent by the AN device. Optionally, the message may be the first request message in S701.

Figure 10:
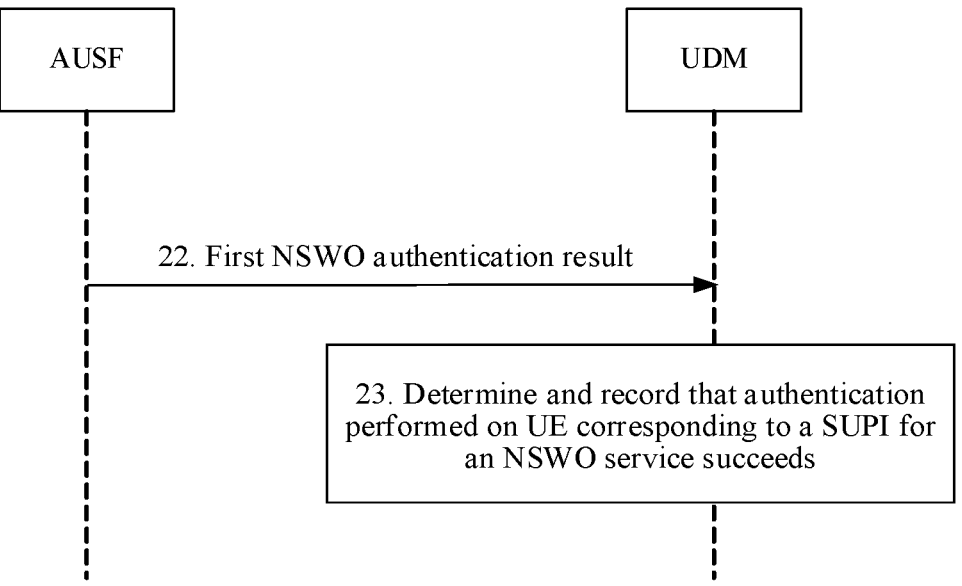
FIG. 10 is still another diagram of message exchange of a method for authentication for an NSWO service according to an embodiment of this application.

Optionally, based on the foregoing embodiment, FIG. 10 is still another diagram of message exchange of a method for authentication for an NSWO service according to an embodiment of this application. As shown in FIG. 10, after step 21, the method for authentication for an NSWO service that is provided in this embodiment may further include the following steps:

Step 22: After the authentication performed on the UE based on the fifth authentication request message succeeds, the AUSF sends a first NSWO authentication result to the UDM.

Optionally, the SUPI, and/or the access network identity of the access network device, and/or the serving network name corresponding to the access network identity may be sent at the same time. The SUPI is included in the second authentication response message, and the access network device is an access network device connected to the terminal.

Optionally, the SUPI might not be sent, but information for identifying the UE, such as a correlation ID or a URI, is sent.

Correspondingly, the UDM receives the first NSWO authentication result sent by the AUSF.

Step 23: The UDM determines and records that the authentication performed on the UE corresponding to the SUPI for the NSWO service succeeds.

Specifically, the first NSWO authentication result indicates that the authentication performed on the UE for the NSWO service succeeds. In the UDM, different UEs may be distinguished by using SUPIs, correlation IDs, or URIs, and different access network devices may be distinguished by using access network identitys or serving network names of the access network devices. After determining that the authentication performed on the UE for the NSWO service succeeds, the AUSF may send the first NSWO authentication result to the UDM, to notify the UDM of the successfully authenticated UE and/or the AN device accessed by the successfully authenticated UE. The UDM records the successfully authenticated UE and/or the AN device accessed by the successfully authenticated UE, to subsequently complete charging for the UE or the AN device.

Optionally, the first NSWO authentication result may further include authentication indication information, and the authentication indication information indicates that the authentication performed on the terminal for the NSWO service succeeds.

It can be learned that, from the authentication indication information, the UDM can explicitly determine that the authentication performed on the UE corresponding to the SUPI for the NSWO service succeeds.

Optionally, the first NSWO authentication result may be carried in a message sent by the AUSF to the UDM. A type and a name of the message are not limited in this embodiment.

Optionally, the message may be a message corresponding to a newly added UDM service. A name of the newly added UDM service and a name of the message corresponding to the newly added UDM service are not limited in this embodiment. The UDM may directly determine, based on the newly added UDM service, that this is a service that notifies a SUPI authentication success, and determine that the authentication performed on the UE corresponding to the SUPI for the NSWO service succeeds.

Optionally, the message may be a message corresponding to an existing UDM service. For example, the message corresponding to the existing UDM service is a UE authentication result confirmation message (Nudm_UEAuthentication_ResultConfirmation).

Figure 11:
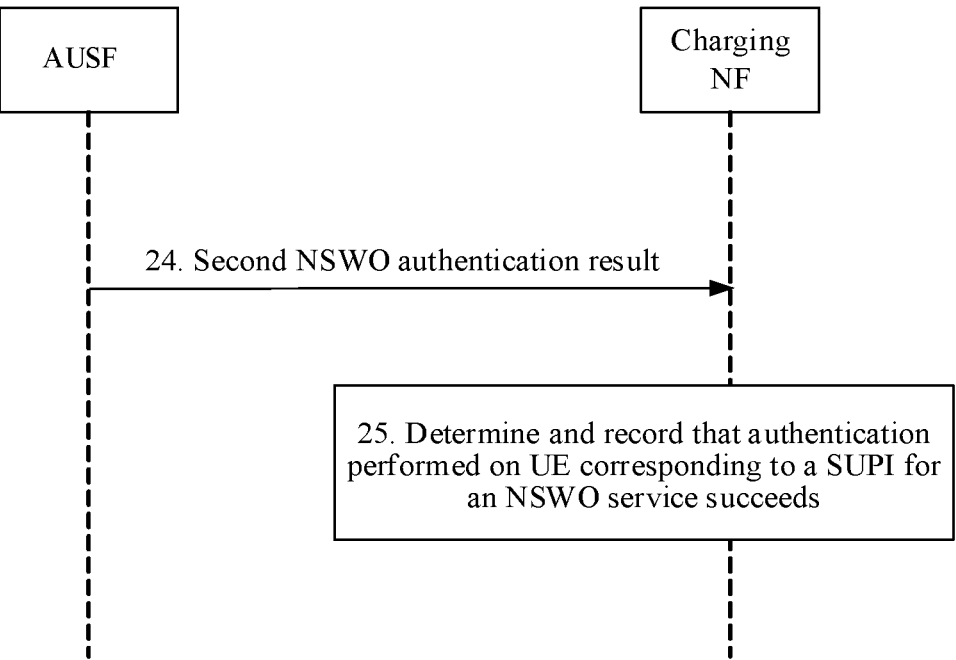
FIG. 11 is still another diagram of message exchange of a method for authentication for an NSWO service according to an embodiment of this application.

Optionally, based on the foregoing embodiment, FIG. 11 is still another diagram of message exchange of a method for authentication for an NSWO service according to an embodiment of this application. As shown in FIG. 11, after step 21, the method for authentication for an NSWO service that is provided in this embodiment may further include the following steps:

Step 24: After the authentication performed on the UE based on the fifth authentication request message succeeds, the AUSF sends a second NSWO authentication result to a charging network function (NF). The second NSWO authentication result includes the SUPI, and/or the access network identity of the access network device, and/or the serving network name corresponding to the access network identity, the SUPI is included in the second authentication response message, and the access network device is an access network device connected to the terminal. Optionally, the SUPI might not be sent, but information for identifying the UE, such as a correlation ID or a URI, is sent.

Correspondingly, the charging NF receives the second NSWO authentication result sent by the AUSF.

Step 25: The charging NF determines and records that the authentication performed on the UE corresponding to the SUPI for the NSWO service succeeds.

A principle of the second NSWO authentication result is similar to that of the first NSWO authentication result in the embodiment shown in FIG. 10. Refer to the related description. Details are not described herein again.

A difference between this embodiment and the embodiment shown in FIG. 10 lies in that a message that carries the second NSWO authentication result and that is sent by the AUSF to the charging NF may be different. A type and a name of the message that carries the second NSWO authentication result are not limited in this embodiment.

Optionally, based on the embodiment shown in FIG. 10, another embodiment of this application provides a method for authentication for an NSWO service. In this embodiment, an AUSF and UE do not delete a key $K_{AUSF}$ that is newly generated in an authentication procedure for the NSWO service, so that the newly generated key $K_{AUSF}$ can be used. AUSF information is updated, that is, a related network element (for example, a UDM or an AMF) needs to update locally stored AUSF information to AUSF information corresponding to NSWO service-related authentication.

Figure 12:
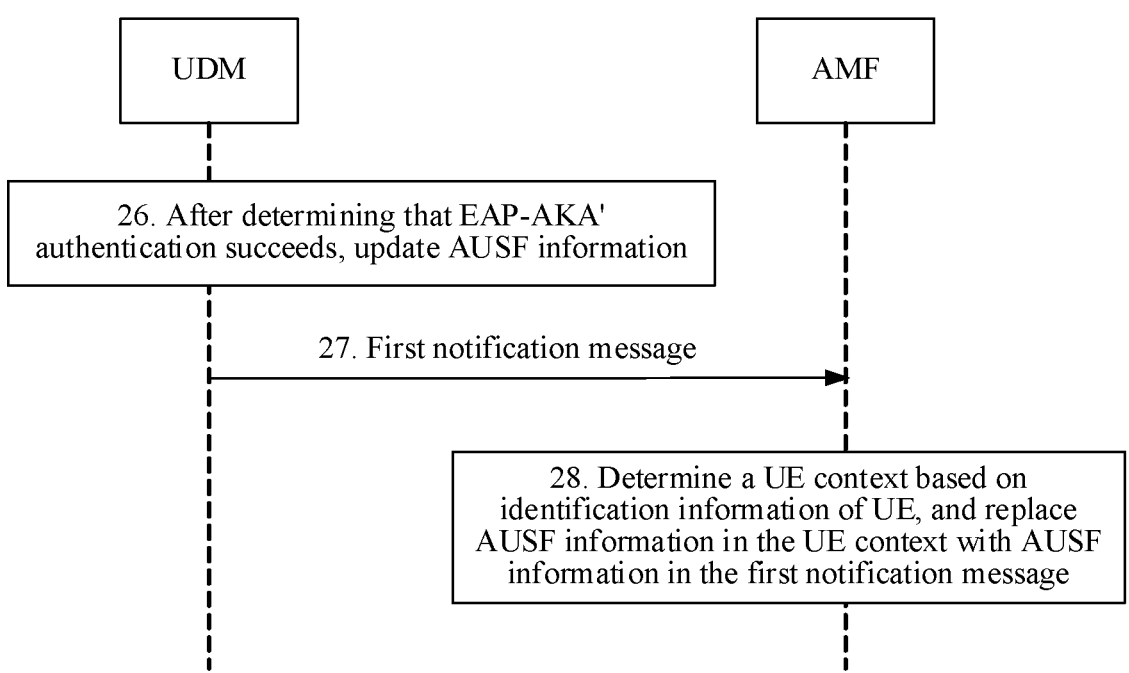
FIG. 12 is still another diagram of message exchange of a method for authentication for an NSWO service according to an embodiment of this application.

Optionally, in an implementation, FIG. 12 is still another diagram of message exchange of a method for authentication for an NSWO service according to an embodiment of this application. As shown in FIG. 12, the method for authentication for an NSWO service that is provided in this embodiment is performed by a UDM and an AMF. After step 23, the method may further include the following steps:

Step 26: After determining that the EAP-AKA' authentication succeeds, the UDM updates AUSF information.

Optionally, the AUSF information may include information for identifying the AUSF, such as AUSF group information or an AUSF instance ID.

Step 27: The UDM sends a first notification message to the AMF. The first notification message includes the AUSF information and identification information of the UE. Correspondingly, the AMF receives the first notification message sent by the UDM.

Step 28: The AMF determines a UE context based on the identification information of the UE, and replaces AUSF information in the UE context with the AUSF information in the first notification message.

The identification information of the UE is used to uniquely distinguish between different UEs. Optionally, the identification information of the UE may include one of the following:

the SUPI;

a callback uri corresponding to the SUPI; or a correlation identifier (correlation id) corresponding to the SUPI.

Optionally, the first notification message is a message corresponding to an existing UDM service. A name of the existing UDM service and a name of the message corresponding to the existing UDM service are not limited in this embodiment. For example, the first notification message is an SDM notification message (Numd_SDM_notification).

It can be learned that, in this implementation, the UDM notifies the AMF to update the locally stored AUSF information, to complete update of the AUSF information.

Figure 13:
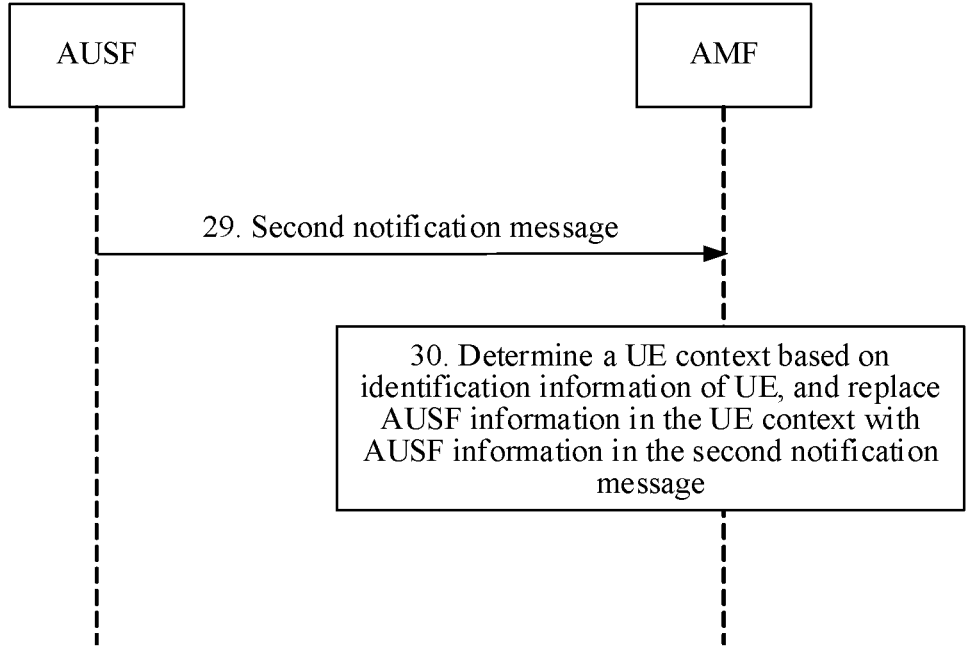
FIG. 13 is still another diagram of message exchange of a method for authentication for an NSWO service according to an embodiment of this application.

Optionally, in another implementation, FIG. 13 is still another diagram of message exchange of a method for authentication for an NSWO service according to an embodiment of this application. As shown in FIG. 13, the method for authentication for an NSWO service that is provided in this embodiment is performed by an AUSF and an AMF. After step 22, the method may further include the following steps:

Step 29: The AUSF sends a second notification message to the AMF. The second notification message includes AUSF information and identification information of the UE. Correspondingly, the AMF receives the second notification message sent by the AUSF.

Step 30: The AMF determines a UE context based on the identification information of the UE, and replaces AUSF information in the UE context with the AUSF information in the second notification message.

The identification information of the UE is used to uniquely distinguish between different UEs. Optionally, the identification information of the UE may include one of the following:

the SUPI;

a callback uri corresponding to the SUPI;

a correlation identifier (correlation id) corresponding to the SUPI;

an authentication context identifier (authentication context ID) corresponding to the SUPI; or an authentication event identifier (authentication event ID) corresponding to the SUPI.

Optionally, the second notification message is a message corresponding to an existing AUSF service. A name of the existing AUSF service and a name of the message corresponding to the existing AUSF service are not limited in this embodiment. For example, the second notification message is an SDM notification message (Nausf_SDM_notification).

It can be learned that, in this implementation, the AUSF notifies the AMF to update the locally stored AUSF information, to complete update of the AUSF information.

An embodiment of this application further provides a method for authentication for an NSWO service, which is applied to a scenario in which after UE completes authentication for the NSWO service for the first time, authentication for the NSWO service needs to be performed again, for example, a scenario in which after the UE registers with a 5G network, the UE and an AUSF share a key.

Optionally, in an implementation, the UE and an AUSF share a key $K_{AUSF}$, and the method for authentication for an NSWO service may include the following steps:

201: The UE calculates, based on the key $K_{AUSF}$, a message authentication code (message authentication code, MAC), which is HMAC-SHA256 (the key $K_{AUSF}$, a fresh parameter, an NSWO indicator).

The HMAC represents a hash-based message authentication code (hashed-based message authentication), and HMAC-SHA256( ) represents an encryption function.

The fresh parameter may be a counter, a sequence number, or the like for reflecting freshness of a message.

The NSWO indicator indicates a need for performance of authentication for the NSWO service.

202: The UE sends a SUCI, the NSWO indicator, the MAC, and the fresh parameter to an AN device.

203: The AN device determines an NSWO network element based on the SUCI, and sends the SUCI, the NSWO indicator, the MAC, and the fresh parameter to the NSWO network element.

204: The NSWO network element determines a UDM based on the SUCI, and sends the SUCI, the NSWO indicator, the MAC, and the fresh parameter to the UDM.

205: The UDM decrypts the SUCI to obtain a SUPI, and obtains corresponding AUSF information and a corresponding AUSF address based on the SUPI. The UDM verifies whether the MAC is correct, and obtains a verification result.

Optionally, in an implementation, that the UDM verifies whether the MAC is correct may include:

The UDM sends the SUPI, the NSWO indicator, the MAC, and the fresh parameter to the AUSF.

The AUSF determines the key $K_{AUSF}$ based on the SUPI, and verifies, by using the key $K_{AUSF}$, the NSWO indicator, and the fresh parameter, whether the received MAC is correct.

If it is verified that the MAC is correct, a success indicator is sent to the UDM.

Optionally, in another implementation, that the UDM verifies whether the MAC is correct may include:

The UDM sends the SUPI, the NSWO indicator, and the fresh parameter to the AUSF.

The AUSF calculates a MAC' in the same manner and sends the MAC' to the UDM.

The UDM verifies whether the MAC and the MAC' are equal.

If they are equal, it is determined that the MAC verification succeeds.

206: The UDM sends the verification result to the NSWO network element.

Refer to step 19 to step 21 in the foregoing embodiment of this application.

Optionally, in another implementation, the UE and an AMF share a key Knasint, and the method for authentication for an NSWO service may include the following steps:

301: The UE calculates, based on the key Knasint, a MAC, which is HMAC-SHA256(Knasint, a fresh parameter, an NSWO indicator).

For meanings of the MAC, HMAC-SHA256( ), the fresh parameter, and the NSWO indicator, refer to the descriptions in the foregoing step 201. Details are not described herein again.

302: The UE sends a SUCI, the NSWO indicator, the MAC, and the fresh parameter to an AN device.

Optionally, a 5G globally unique temporary UE identity (5G-GUTI) may be further sent.

303: The AN device determines an NSWO network element based on the SUCI, and sends the SUCI, the NSWO indicator, the MAC, and the fresh parameter to the NSWO network element.

Optionally, if the AN device further receives the 5G-GUTI, and the AN may determine the AMF by using the 5G-GUTI, step 307 is performed.

304: The NSWO network element determines a UDM based on the SUCI, and sends the SUCI, the NSWO indicator, the MAC, and the fresh parameter to the UDM.

Optionally, if the NSWO network element further receives the 5G-GUTI, and the NSWO network element may determine the AMF by using the 5G-GUTI, step 308 is performed.

305: The UDM decrypts the SUCI to obtain a SUPI, and obtains corresponding AMF information and a corresponding AMF address based on the SUPI. The UDM verifies whether the MAC is correct, and obtains a verification result.

Optionally, in an implementation, that the UDM verifies whether the MAC is correct may include:

The UDM sends the SUPI (or a callback uri and/or a correlation id), the NSWO indicator, the MAC, and the fresh parameter to the AMF.

The AMF determines Knasint based on the SUPI (or the callback uri and/or the correlation id), and verifies, by using Knasint, the NSWO indicator, and the fresh parameter, whether the received MAC is correct.

If it is verified that the MAC is correct, a success indicator is sent to the UDM.

Optionally, in another implementation, that the UDM verifies whether the MAC is correct may include:

The UDM sends the SUPI (or a callback uri and/or a correlation id), the NSWO indicator, and the fresh parameter to the AMF.

The AMF calculates a MAC' in the same manner and sends the MAC' to the UDM.

The UDM verifies whether the MAC and the MAC' are equal.

If they are equal, it is determined that the verification succeeds.

306: The UDM sends the verification result to the NSWO network element.

For subsequent actions, refer to step 19 to step 21 in the foregoing embodiment of this application.

307: The AN device sends the 5G-GUTI, the NSWO indicator, the MAC, and the fresh parameter to the AMF.

The AMF determines Knasint based on the SUPI (or the callback uri and/or the correlation id), and verifies, by using Knasint, the NSWO indicator, and the fresh parameter, whether the received MAC is correct. The AMF sends a verification result to the AN. For a subsequent action of the AN, refer to the foregoing embodiment.

308: The NSWO network element sends the 5G-GUTI, the NSWO indicator, the MAC, and the fresh parameter to the AMF.

The AMF determines Knasint based on the SUPI (or the callback uri and/or the correlation id), and verifies, by using Knasint, the NSWO indicator, and the fresh parameter, whether the received MAC is correct. The AMF sends a verification result to the NSWO network element. For a subsequent action of the NSWO network element, refer to the foregoing embodiment.

An embodiment of this application further provides a method for authentication for an NSWO service, which is applied to a scenario in which a 5G network includes UE, an AN device, a AAA network element, an AUSF, and a UDM.

Optionally, the embodiment shown in FIG. 4A and FIG. 4B may be reused. The UDM directly removes CK' and IK', and sends, to the AUSF, an authentication vector with CK' and IK' removed. The AUSF then sends, to the AAA network element, the authentication vector with CK' and IK' removed. Then, the UE and the AAA network element perform two-way authentication. A subsequent action of the AAA network element is consistent with an operation of the AUSF in the embodiment shown in FIG. 4A and FIG. 4B. Then, the AAA network element sends an authentication result to the AN. For a subsequent action of the AN, refer to the foregoing embodiment.

Optionally, the embodiment shown in FIG. 5A and FIG. 5B may be reused. The UDM sends a complete authentication vector to the AUSF. After receiving the complete authentication vector from the UDM, the AUSF deletes CK' and IK', and then sends the authentication vector to the AAA network element. Then, the UE and the AAA network element perform two-way authentication. A subsequent action of the AAA network element is consistent with an operation of the AUSF in the embodiment shown in FIG. 5A and FIG. 5B. Then, the AAA network element sends an authentication result to the AN. For a subsequent action of the AN, refer to the foregoing embodiment.

An embodiment of this application further provides a method for authentication for an NSWO service, which is applied to a scenario in which a 5G network includes UE, an AN device, a AAA network element, and a UDM.

In this case, the AN device may directly connect to the AAA network element, or first connect to a AAA proxy, and then connect to the AAA network element by using the AAA proxy. Then, the AAA network element may obtain an authentication vector from the UDM. In this case, functions of both an NSWO network element and an AUSF may be implemented by the AAA network element. The AAA network element may obtain, from the UDM, an authentication vector that does not include a key CK' or IK', and perform an operation corresponding to the AUSF. Alternatively, after the keys CK' and IK' are obtained, the keys may be deleted, or another operation is performed. For a specific operation, an action of processing the keys by the AUSF in the foregoing embodiment of this application may be reused.

It should be noted that the method for authentication for an NSWO service that is provided in embodiments of this application is not limited to authentication for the NSWO service, and is also applicable to authentication for another service. It may be understood that an authentication method and procedure are described by using the NSWO service as an example in this application. In an authentication procedure for another service, the NSWO network element may be replaced with a service authentication network element, and the service authentication network element participates in authentication on UE. If the authentication succeeds, the service authentication network element receives the authentication result from the AUSF, and sends the result to the AN. An operation on another key is similar to the foregoing operation on CK', IK', $K_{AUSF}$, or the like. In addition, an operation performed by the AN based on the authentication result is not limited, either.

It may be understood that, to implement the foregoing functions, devices in this application include corresponding hardware and/or software modules for performing the functions. With reference to algorithms and steps in examples described in embodiments disclosed in this specification, this application can be implemented by hardware or a combination of hardware and computer software. Whether a function is performed by hardware or hardware driven by computer software depends on specific applications and design constraints of the technical solutions. Persons skilled in the art may use different methods to implement the described functions for each specific application with reference to embodiments. However, it should not be considered that the implementation goes beyond the scope of this application.

In embodiments of this application, each device may be divided into functional modules based on the foregoing method example. For example, the functional modules may be divided corresponding to the functions, or two or more functions may be integrated into one processing module. It should be noted that, division of the modules in embodiments of this application is an example, and is merely division of logical functions. During actual implementation, another division manner may be used. It should be noted that a name of a module in embodiments of this application is an example, and the name of the module is not limited during actual implementation.

Figure 14:
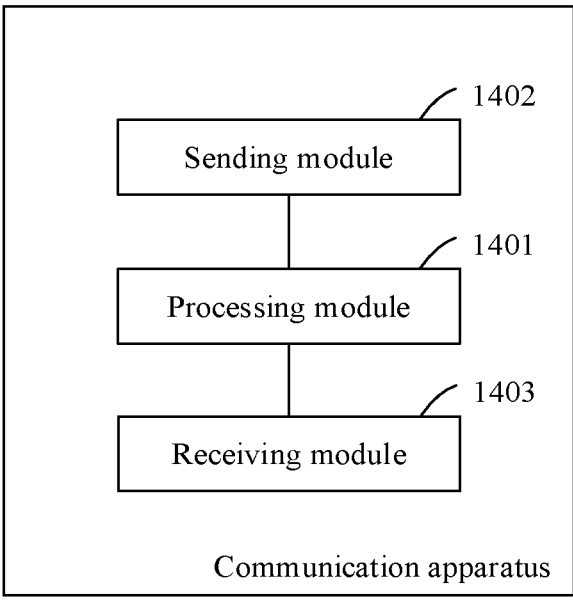
FIG. 14 is a schematic diagram of a structure of a communication apparatus according to an embodiment of this application.

When each functional module is obtained through division based on each corresponding function, FIG. 14 is a schematic diagram of a structure of a communication apparatus according to an embodiment of this application. As shown in FIG. 14, the communication apparatus may include a sending module 1402, a receiving module 1403, and a processing module 1401.

The sending module 1402 is configured to send data.

The receiving module 1403 is configured to receive data.

The processing module 1401 is configured to perform other steps to implement the method for authentication for an NSWO service that is provided in the foregoing method embodiment.

Figure 15:
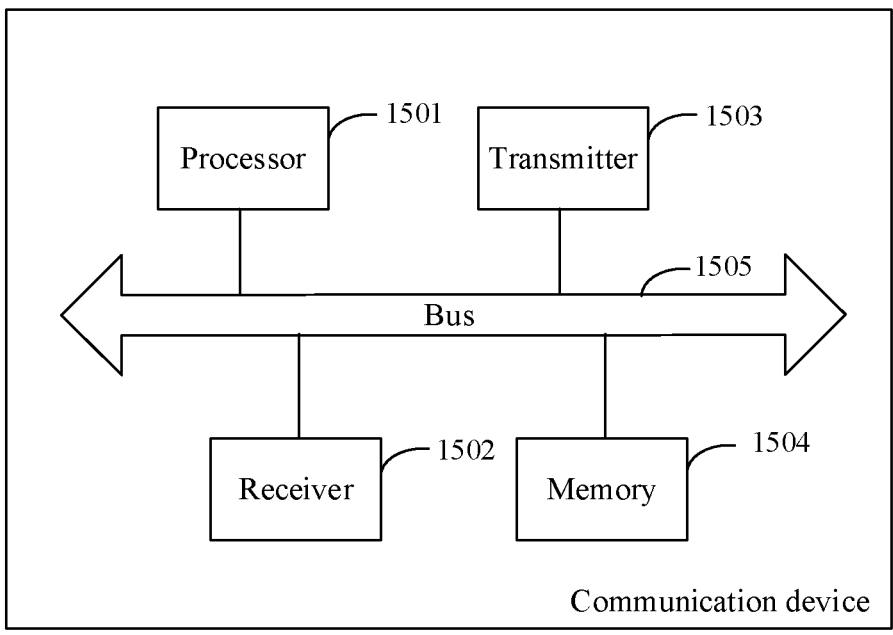
FIG. 15 is a schematic diagram of a structure of a communication device according to an embodiment of this application.

FIG. 15 is a schematic diagram of another structure of a communication device according to an embodiment of this application. Optionally, the communication device may be a terminal device, an AN device, an NSWO network element, an AUSF, or a UDM. As shown in FIG. 15, the communication device may include a processor 1501, a receiver 1502, a transmitter 1503, a memory 1504, and a bus 1505. The processor 1501 includes one or more processing cores. The processor 1501 runs a software program and a module to perform various functional applications and information processing. The receiver 1502 and the transmitter 1503 may be implemented as a communication component, and the communication component may be a baseband chip. The memory 1504 is connected to the processor 1501 by using the bus 1505. The memory 1504 may be configured to store at least one program instruction, and the processor 1501 is configured to execute the at least one program instruction, to implement the technical solution in the foregoing embodiment. An implementation principle and a technical effect thereof are similar to those of the foregoing method-related embodiment, and details are not described herein again.

In this embodiment of this application, the processor may be a general-purpose processor, a digital signal processor, an application-specific integrated circuit, a field programmable gate array or another programmable logic device, a discrete gate or a transistor logic device, or a discrete hardware component, and may implement or perform methods, steps, and logical block diagrams disclosed in embodiments of this application. The general-purpose processor may be a microprocessor or any conventional processor or the like. Steps of the method disclosed with reference to embodiments of this application may be directly performed by a hardware processor, or may be performed by using a combination of hardware in the processor and a software module.

In this embodiment of this application, the memory may be a non-volatile memory, such as a hard disk drive (HDD) or a solid-state drive (SSD), or may be a volatile memory, such as a random-access memory (RAM). The memory may be but not limited to any medium that can be used to carry or store expected program code in a form of instructions or a data structure and that can be accessed by a computer. Alternatively, the memory in this embodiment of this application may be a circuit or any other apparatus that can implement a storage function, and is configured to store program instructions and/or data.

An embodiment of this application provides a computer program product. When the computer program product runs on a device, the device is enabled to perform the technical solution in the foregoing embodiment. An implementation principle and a technical effect thereof are similar to those of the foregoing related embodiment, and details are not described herein again.

An embodiment of this application provides a computer-readable storage medium. The computer-readable storage medium stores program instructions. When the program instructions are executed by a device, the device is enabled to perform the technical solution in the foregoing embodiment. An implementation principle and a technical effect thereof are similar to those of the foregoing related embodiment, and details are not described herein again.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method of authentication for a non-seamless wireless local area network offload (NSWO) service, comprising:

receiving, from an NSWO network element, a first authentication request message, wherein the first authentication request message comprises a subscription concealed identifier (SUCI) and fourth NSWO indication information, and the fourth NSWO indication information indicates to perform authentication for the NSWO service;

sending, based on the fourth NSWO indication information, a second authentication request message to a unified data management, wherein the second authentication request message comprises the SUCI and fifth NSWO indication information, and the fifth NSWO indication information indicates to perform authentication for the NSWO service;

receiving a second authentication response message from the unified data management, wherein the second authentication response message comprises a second extensible authentication protocol-authentication and key agreement (EAP-AKA') authentication vector and a subscription permanent identifier (SUPI) of a terminal device, and the SUPI is corresponding to the SUCI;

sending a first authentication response message to the NSWO network element based on the second authentication response message, wherein the first authentication response message is an authentication response message corresponding to an EAP-AKA' authentication algorithm;

receiving a fifth authentication request message from the NSWO network element; and performing authentication on the terminal device based on the fifth authentication request message and the second EAP-AKA' authentication vector.

2. The method according to claim 1, the method further comprising:

determining, based on the fourth NSWO indication information, that authentication is to be performed for the NSWO service.

3. The method according to claim 1, wherein the second authentication response message comprises RAND and AUTN, and the sending the first authentication response message to the NSWO network element based on the second authentication response message comprises:

sending the first authentication response message including the RAND and the AUTN to the NSWO network element.

4. The method according to claim 1, wherein the first authentication response message comprises an extensible authentication protocol/authentication and key agreement-challenge.

5. The method according to claim 1, wherein the fifth authentication request message comprises RES, the second EAP-AKA' authentication vector comprises XRES, and the performing authentication on the terminal device based on the fifth authentication request message and the second EAP-AKA' authentication vector, comprises:

verifying whether the RES and the XRES are equal.

6. The method according to claim 1, wherein the second EAP-AKA' authentication vector comprises a key CK' and a key IK', after the performing authentication on the terminal device based on the fifth authentication request message, the method further comprising:

forgoing calculating a key KAUSF, wherein the key KAUSF is calculated based on the key CK' and the key IK'.

7. The method according to claim 1, wherein the first authentication request message is an authentication service request message for user equipment (UE) authentication, the first authentication response message is an authentication service response message for UE authentication, the second authentication request message is a get service request message for user equipment (UE) authentication, and the second authentication response message is a get service response message for UE authentication.

8. The method according to claim 1, wherein the first authentication request message further comprises an access network identity, and the second authentication request message further comprises the access network identity, and the access network identity is used to perform authentication for the NSWO service.

9. The method according to claim 1, wherein the second EAP-AKA' authentication vector comprises a key CK' and a key IK', and the sending the first authentication response message to the NSWO network element based on the second authentication response message comprises:

deleting the key CK' and the key IK' from the second EAP-AKA' authentication vector; and sending the first authentication response message to the NSWO network element, wherein the first authentication response message comprises the second EAP-AKA' authentication vector with the keys deleted.

10. A method of authentication for a non-seamless wireless local area network offload (NSWO) service, comprising:

receiving a second authentication request message from an authentication server function, wherein the second authentication request message comprises a subscription concealed identifier (SUCI) and fifth NSWO indication information, and the fifth NSWO indication information indicates to perform authentication for the NSWO service;

calculating a subscription permanent identifier (SUPI) based on the SUCI;

determining, based on the second authentication request message, to use an extensible authentication protocol-authentication and key agreement (EAP-AKA') authentication method;

obtaining a first EAP-AKA' authentication vector based on the SUPI; and sending a second authentication response message to the authentication server function, wherein the second authentication response message comprises a second EAP-AKA' authentication vector, and the second EAP-AKA' authentication vector is associated with the first EAP-AKA' authentication vector.

11. The method according to claim 10, wherein the second EAP-AKA' authentication vector is associated with the first EAP-AKA' authentication vector comprises:

the second EAP-AKA' authentication vector is the same as the first EAP-AKA' authentication vector.

12. The method according to claim 10, wherein the second EAP-AKA' authentication vector is associated with the first EAP-AKA' authentication vector comprises:

the second EAP-AKA' authentication vector is a part obtained after a key CK' and a key IK' are deleted from the first EAP-AKA' authentication vector.

13. The method according to claim 10, wherein the second authentication request message further comprises an access network identity, and the access network identity is used to perform authentication for the NSWO service.

14. The method according to claim 10, wherein the second authentication request message is a get service request message for user equipment (UE) authentication, and the second authentication response message is a get service response message for UE authentication.

15. A method of authentication for a non-seamless wireless local area network offload (NSWO) service, comprising:

after determining to perform the NSWO service, sending a subscription concealed identifier (SUCI) of a terminal device to an access network device, wherein the SUCI is used to determine an address of an NSWO network element;

receiving a third authentication request message that is from the NSWO network element via the access network device, wherein the third authentication request message is an authentication request message corresponding to an extensible authentication protocol-authentication and key agreement EAP-AKA' authentication algorithm;

performing authentication verification on a network by using the EAP-AKA' authentication algorithm;

after the authentication verification succeeds, calculating RES; and sending the RES to the NSWO network element via the access network device, wherein the RES is used to perform authentication on the terminal device, wherein after the authentication verification succeeds, the method further comprises:

calculating a key CK' and a key IK', and forgoing calculating a key $K_{AUSF}$, wherein the key $K_{AUSF}$ is calculated based on the key CK' and the key IK'.

16. The method according to claim 15, wherein the method further comprises, after the calculating the key CK' and the key IK', deleting the key CK' and the key IK'.

17. A communication apparatus, comprising at least one processor and at least one memory, wherein the at least one memory is configured to store instructions, and the at least one processor is configured to execute the instructions thereby causing the communication apparatus to:

after determining to perform a non-seamless wireless local area network offload (NSWO) service, send a subscription concealed identifier (SUCI) of the communication apparatus to an access network device, wherein the SUCI is used to determine an address of an NSWO network element;

receive a third authentication request message from the NSWO network element via the access network device, wherein the third authentication request message is an authentication request message corresponding to an extensible authentication protocol-authentication and key agreement (EAP-AKA') authentication algorithm; and perform authentication verification on a network by using the EAP-AKA' authentication algorithm;

after the authentication verification succeeds, calculate RES; and send the RES to the NSWO network element via the access network device, wherein the RES is used to perform authentication on the communication apparatus, wherein the at least one processor being further configured to further execute the instructions thereby further causing the communication apparatus to:

after the authentication verification succeeds, calculate a key CK' and a key IK', and forgo calculating a key $K_{AUSF}$, wherein the key $K_{AUSF}$ is calculated based on the key CK' and the key IK'.

18. The communication apparatus according to claim 17, wherein the at least one processor being further configured to further execute the instructions thereby further causing the communication apparatus to:

after calculating the key CK' and the key IK', delete the key CK' and the key IK'.

19. A system, comprising at least one of an authentication server function or a unified data management, wherein the authentication server function comprises at least one first processor and at least one first memory, wherein the at least one first memory is configured to store first instructions, and the at least one first processor is configured to execute the first instructions thereby causing the authentication server function to:

receive, from an NSWO network element, a first authentication request message, wherein the first authentication request message comprises a subscription concealed identifier (SUCI) and fourth NSWO indication information, and the fourth NSWO indication information indicates to perform authentication for the NSWO service;

send, based on the fourth NSWO indication information, a second authentication request message to the unified data management, wherein the second authentication request message comprises the SUCI and fifth NSWO indication information, and the fifth NSWO indication information indicates to perform authentication for the NSWO service;

receive a second authentication response message from the unified data management, wherein the second authentication response message comprises a second extensible authentication protocol-authentication and key agreement (EAP-AKA') authentication vector and a subscription permanent identifier (SUPI) of a terminal device, and the SUPI is corresponding to the SUCI;

send a first authentication response message to the NSWO network element based on the second authentication response message, wherein the first authentication response message is an authentication response message corresponding to an EAP-AKA' authentication algorithm;

receive a fifth authentication request message from the NSWO network element; and perform authentication on the terminal device based on the fifth authentication request message and the second EAP-AKA' authentication vector; and the unified data management comprises at least one second processor and at least one second memory, wherein the at least one second memory is configured to store second instructions, and the at least one second processor is configured to execute the second instructions thereby causing the unified data management to:

receive the second authentication request message from the authentication server function;

calculate the SUPI based on the SUCI;

determine, based on the second authentication request message, to use an extensible authentication protocol-authentication and key agreement (EAP-AKA') authentication method;

obtain a first EAP-AKA' authentication vector based on the SUPI, wherein the second EAP-AKA' authentication vector is associated with the first EAP-AKA' authentication vector; and send the second authentication response message to the authentication server function.

20. The system according to claim 19, wherein the second EAP-AKA' authentication vector comprises a key CK' and a key IK', and the at least one first processor is configured to execute the first instructions thereby further causing the authentication server function to:

after performing authentication on the terminal device based on the fifth authentication request message, forgoing calculating a key KAUSF, wherein the key KAUSF is calculated based on the key CK' and the key IK'.

* * * * *